(12) United States Patent
Lee et al.

(10) Patent No.: US 11,055,378 B1
(45) Date of Patent: Jul. 6, 2021

(54) SYSTEMS AND METHODS FOR LOADING WEBSITES WITH MULTIPLE ITEMS

(71) Applicant: Coupang Corp., Seoul (KR)

(72) Inventors: Byeong Yong Lee, Seoul (KR); Zhongxing Wang, Shanghai (CN); Yufeng Zhang, Shanghai (CN); Wenhua Zhu, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/999,163

(22) Filed: Aug. 21, 2020

(51) Int. Cl.
*G06F 17/00* (2019.01)
*G06F 16/957* (2019.01)
*G06Q 30/06* (2012.01)
*G06F 16/958* (2019.01)

(52) U.S. Cl.
CPC ........ *G06F 16/9577* (2019.01); *G06F 16/958* (2019.01); *G06F 16/9574* (2019.01); *G06Q 30/0643* (2013.01)

(58) Field of Classification Search
CPC .. G06F 40/14; G06F 16/9577; G06F 16/9574; G06Q 10/10
USPC .................................................. 715/234, 200
See application file for complete search history.

(56) References Cited

U.S. PATENT DOCUMENTS

| | | | | |
|---|---|---|---|---|
| 7,689,457 | B2 * | 3/2010 | Chan | G06Q 30/0641 705/26.7 |
| 7,743,059 | B2 * | 6/2010 | Chan | G06F 16/9535 707/737 |
| 7,930,646 | B2 * | 4/2011 | De Souza Sana | G06F 3/0481 715/784 |
| 8,095,521 | B2 * | 1/2012 | Chan | G06Q 30/0631 707/705 |
| 8,151,183 | B2 | 4/2012 | Chen et al. | |
| 8,301,623 | B2 * | 10/2012 | Chakrabarti | G06Q 30/02 707/723 |

(Continued)

FOREIGN PATENT DOCUMENTS

KR 10-2012-0009738 A 2/2012

OTHER PUBLICATIONS

Camilo Reyes, Quick Tip: How to Throttle Scroll Events, Published Jul. 28, 2016, Sitepoint.com, pp. 1-6 (pdf).*

(Continued)

*Primary Examiner* — Manglesh M Patel
(74) *Attorney, Agent, or Firm* — Finnegan, Henderson, Farabow, Garrett & Dunner LLP

(57) ABSTRACT

A computerized system for transmitting website data to client devices. the system includes a memory storing instructions and a processor configured to execute the instructions to perform operations. The operations may include generating a plurality of clusters including a fixed number of records, receiving a request to display a list from a client device, and identifying a first cluster, from the plurality of clusters, for display at a landing page. The operations may also include generating a first transmission packet with the first cluster and a callback script, the callback script including navigation triggered functions and a callback message. The operations may also include transmitting the first transmission packet to the client device, receiving the callback message from the client, identifying a second cluster, generating a second transmission packet with the second cluster, and transmitting the second transmission packet.

18 Claims, 19 Drawing Sheets

(56) References Cited

U.S. PATENT DOCUMENTS

| | | | |
|---|---|---|---|
| 8,793,573 B2* | 7/2014 | Beckmann | G06F 16/54 |
| | | | 715/251 |
| 9,317,622 B1 | 4/2016 | Zuromski et al. | |
| 9,875,314 B2 | 1/2018 | McWeeney | |
| 9,984,002 B2 | 5/2018 | Sundaravaradan et al. | |
| 2011/0055314 A1 | 3/2011 | Rosenstein et al. | |
| 2011/0320443 A1 | 12/2011 | Ray et al. | |
| 2013/0024471 A1* | 1/2013 | Mitrovic | G06F 16/9535 |
| | | | 707/769 |
| 2013/0145252 A1 | 6/2013 | Lie et al. | |
| 2013/0227398 A1 | 8/2013 | Bolstad | |
| 2014/0304499 A1* | 10/2014 | Gopinath | H04L 63/168 |
| | | | 713/151 |
| 2015/0089626 A1* | 3/2015 | Korangy | H04L 63/02 |
| | | | 726/12 |
| 2017/0006138 A1 | 1/2017 | Paila et al. | |
| 2017/0046768 A1* | 2/2017 | Kumari | H04L 67/22 |
| 2017/0053325 A1* | 2/2017 | VanDuyn | G06F 3/0485 |
| 2019/0147503 A1* | 5/2019 | Burriesci | G06F 16/972 |
| | | | 705/14.73 |

OTHER PUBLICATIONS

International Search Report and the Written Opinion of the International Searching Authority for counterpart PCT/IB2021/051254, dated Apr. 15, 2021. 9 pages.

* cited by examiner

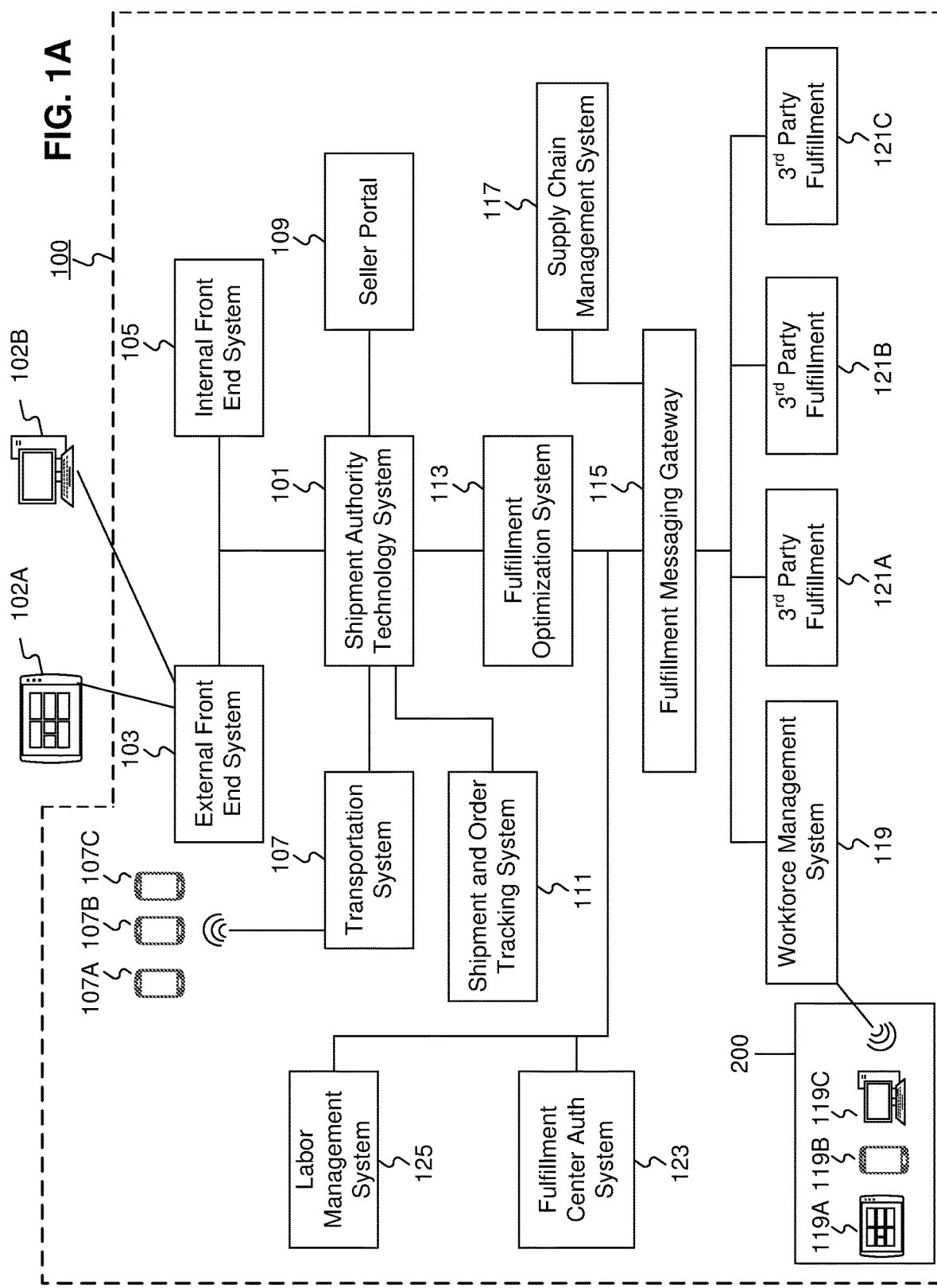

Favorites  Application                                              login  Sign Up  Service center

[all]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews  20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

Product Details     Reviews (285)     Contact Us     Shipping & Returns

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

11/28/2018                    Shopping Cart

| General Purchasing (1) | Periodic Delivery (0) |

☑ Select All          Product Information          Item Amount   shipping fee

Rocket shipping products   free shipping

☑  [img] Mozzarella cheese, 1kg, 2 pieces
        Tomorrow (Thursday) 11/29
        Arrival guarantee (order before 12 pm)
                                    20,510 won           [1 ▼]    free

| Even if you add other rocket shipping products, free shipping available |   shipping Free   Order amount
                                                                                            $20.00

☑ Select All (1/1)   [Delete all]   [sold out / discontinued products clear all]   [interest payment]

$__.00

[Continue shopping]   [Buy now]

Customers who bought this product also purchased
                                                                                       1/5

Rosé spaghetti sauce,    Napoli Chunky Tomato   Grated Parmesan      Bacon and Mushroom Cream
600g, 2 pieces           Pasta Sauce,           cheese,              Pasta Sauce,
6,500 won            3,800 won          6,460 won        4,870 won
(54 won per 10g)         (86 won per 10g)       (285 won per 10g)    (108 won per 10g)

FIG. 1D

SYSTEMS AND METHODS FOR LOADING WEBSITES WITH MULTIPLE ITEMS

TECHNICAL FIELD

The present disclosure generally relates to computerized systems and methods for data transmission and website visualization. In particular, embodiments of the present disclosure relate to systems and methods for generating and transmitting clusters of data with instructions for website visualization that minimize website loading times and allows dynamic adaptation of visualization functions.

BACKGROUND

One of the most important aspects for successful online experience is having fast loading of websites. Websites that load quickly allow users to interact seamlessly with online applications, providing a smooth and pleasant user experience. Indeed, fast loading is important for website usability because website visitors do not have the patience to wait for a slow-loading website. When websites fail to load quickly, users frequently leave the website and may be reluctant to visit those slow websites again.

Yet, providing quick loading of websites present complex technical challenges for data transmission and visualization. First, many users access websites using connections with limited bandwidth and/or high bit error rates. For example, users frequently access websites through mobile connections, which frequently have low bandwidth or poor connectivity, that may cause website loading delays. Further, because website loading is also determined by the processing capacity of the client device, website designers must balance type and quantity of content to be presented against loading speed. Moreover, loading websites quickly also has technical challenges during content generation. Nowadays many websites use multi-sourced information to create personalized websites. For example, websites frequently include targeted advertising and customized interfaces based on user preferences. Including targeted content in a website requires collecting and processing data "on-the-fly" to dynamically generate the website with the personalized content. The operations required to provide customized websites may also cause delays during website loading. For example, websites that display personalized or aggregated content frequently need to collect information from a plurality of sources (such as multiple databases or servers), assemble the website for display to the user, and then transmit the assembled website to the user. Each one of these operations may be associated with delays that ultimately lower website loading speeds. Therefore, providing quickly loading websites to client devices present technical challenges during website generation stages, content deployment, and content rendering or visualization.

The disclosed systems and methods for data transmission and website visualization address one or more problems set forth above and/or other problems in the prior art.

SUMMARY

One aspect of the present disclosure is directed to a computerized system for transmitting website data to client devices. The system may include a memory storing instructions and at least one processor configured to execute the instructions to perform operations. The operations may include generating a plurality of clusters including a fixed number of records (records in each cluster sharing at least one metadata field), receiving a request to display a list from a client device (the request including a client account and a location of the client device), and identifying a first cluster (from the plurality of clusters) for display at a landing page based on the client account and the location. The operations may also include generating a first transmission packet, the first transmission packet including the first cluster and a callback script, the callback script including a navigation triggered function and a callback message, and transmitting the first transmission packet to the client device. The operations may also include receiving the callback message from the client device, identifying a second cluster from the plurality of clusters based on the client account, the client device, and the first cluster, generating a second transmission packet including the second cluster and the callback script, and transmitting the second transmission packet to the client device.

Another aspect of the present disclosure is directed to a computer-implemented method for transmitting website data to client devices. The method may include generating a plurality of clusters including a fixed number of records (records in each cluster sharing at least one metadata field), receiving a request to display a list from a client device (the request including a client account and a location of the client device), and identifying a first cluster (from the plurality of clusters) for display at a landing page based on the client account and the location. The method may also include generating a first transmission packet (the first transmission packet including the first cluster and a callback script) the callback script including a navigation triggered function and a callback message, and transmitting the first transmission packet to the client device. The method also include receiving the callback message from the client device, identifying a second cluster (from the plurality of clusters) based on the client account, the client device, and the first cluster, generating a second transmission packet including the second cluster and the callback script, and transmitting the second transmission packet to the client device.

Yet another aspect of the present disclosure is directed to a system for transmitting website data to a client device. The system may include at least one processor and at least one memory device including instructions that when executed cause the at least one processor to: generate a plurality of clusters each including a fixed number of records (the records in each cluster sharing at least a product category metadata field and a database ID metadata field), receive a request to display a list of items in a virtual cart from a mobile device (the request including a client account and a location of the mobile device), and identify a first cluster (from the plurality of clusters) for display at a landing page based on the client account and the location. Instructions may also case the al least one processor to: generate a first transmission packet, the first transmission packet including the first cluster and a callback script, the callback script including a scrolling triggered function and a callback message, the scrolling triggered function configuring the mobile device to transmit the callback message when the mobile device displays a second to last record in a cluster. The instructions may also case the al least one processor to: transmit the first transmission packet to the mobile device, receive the callback message from the mobile device, identify a second cluster from the plurality of clusters based on the client account, the mobile device, and the first cluster, generate a second transmission packet including the second cluster and the callback script, and transmit the second transmission packet to the mobile device.

BRIEF DESCRIPTION OF THE DRAWINGS

FIG. 1A is a schematic block diagram illustrating an exemplary embodiment of a network including computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

FIG. 1D depicts a sample cart page that includes items in a virtual shopping cart along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples. Instead, the proper scope of the invention is defined by the appended claims.

Embodiments of the present disclosure are directed to systems and methods for transmitting data for displaying websites on client devices. The disclosed systems and methods may improve rendering of websites on client devices by transmitting clustered data to reduce website loading times. Some embodiments of the present disclosure may employ clustering techniques that use metadata of files to create segregated data packets that are sent to a user. In some embodiments, instead of storing and transmitting all files required for website visualization in a single transmission, the disclosed systems and methods use data clustering combined with metadata-based pagination to generate clusters or information packets that can be sent to a user sequentially. Such segregation of information may improve the technical field of electronic data transmission by enabling more stable communication and/or reduce loading times of webpages by starting website display faster. The clustered transmission of information may also improve the technical field of electronic content delivery and website design, providing tools for faster communication with client devices.

Moreover, the disclosed system and methods may leverage cache memory in databases and client devices to simplify visualization or display of complex websites. For instance, some embodiments of the disclosed systems and methods may use remote dictionary server data structures to collect, sort, and group files or records in cache memory to prepare them for transmission. Such segregation of files in cache memory may facilitate retrieving and sorting of data, which results in a more seamless display of websites. Particularly for websites that use multi-sourced information, segregating data using remote dictionary server data structure may allow loading websites in multiple stages reducing latency.

The disclosed systems and methods may also improve the technical field of website deployment by providing tools that create more flexible website visualization. Particularly for websites that display lists, such as an online shopping cart, disclosed methods may allow to cluster information and transmit it in different packets as the user navigates the website. Such deployment may allow the generation of websites with uniform latency, or fixed transmission time intervals (TTIs), regardless of the website complexity or the number of items that would be displayed. Having that consistency in transmission may allow the design and transmission of more complex websites but sustaining an acceptable loading time that does not lose viewer attention, facilitating design of websites and minimizing bandwidth constrains.

Moreover, some embodiments of the disclosed systems and methods may improve the technical field of dynamic website development by reducing the latency of communications between servers and databases. Some embodiments of the disclosed systems and methods may employ clustering techniques and data structures that allow sourcing data in specific regions.

Furthermore, the disclosed systems and methods may also improve the technical field of networked communication by distributing database resources based on an arrangement of fields associated with metadata according to the source of information. For example, the disclosed systems and methods may improve network communications by distributing packets (or clusters) of information in an architecture that places data required for customization of a website to reduce network congestion. In such embodiments the disclosed systems and methods may also improve network delay, packet loss, or jitter relating to the network traffic passing by segregating information in discretized packets. For example, disclosed systems and methods may generate data clusters that can be easily accessible and transmitted over networks, even if they have low bandwidth. In such embodiments, the segregation of data may minimize the necessity to retransmit information (or if it is needed it can be completed faster) to avoid excess traffic volume on the network and hindrance of network performance.

Reference will now be made to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below regarding FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
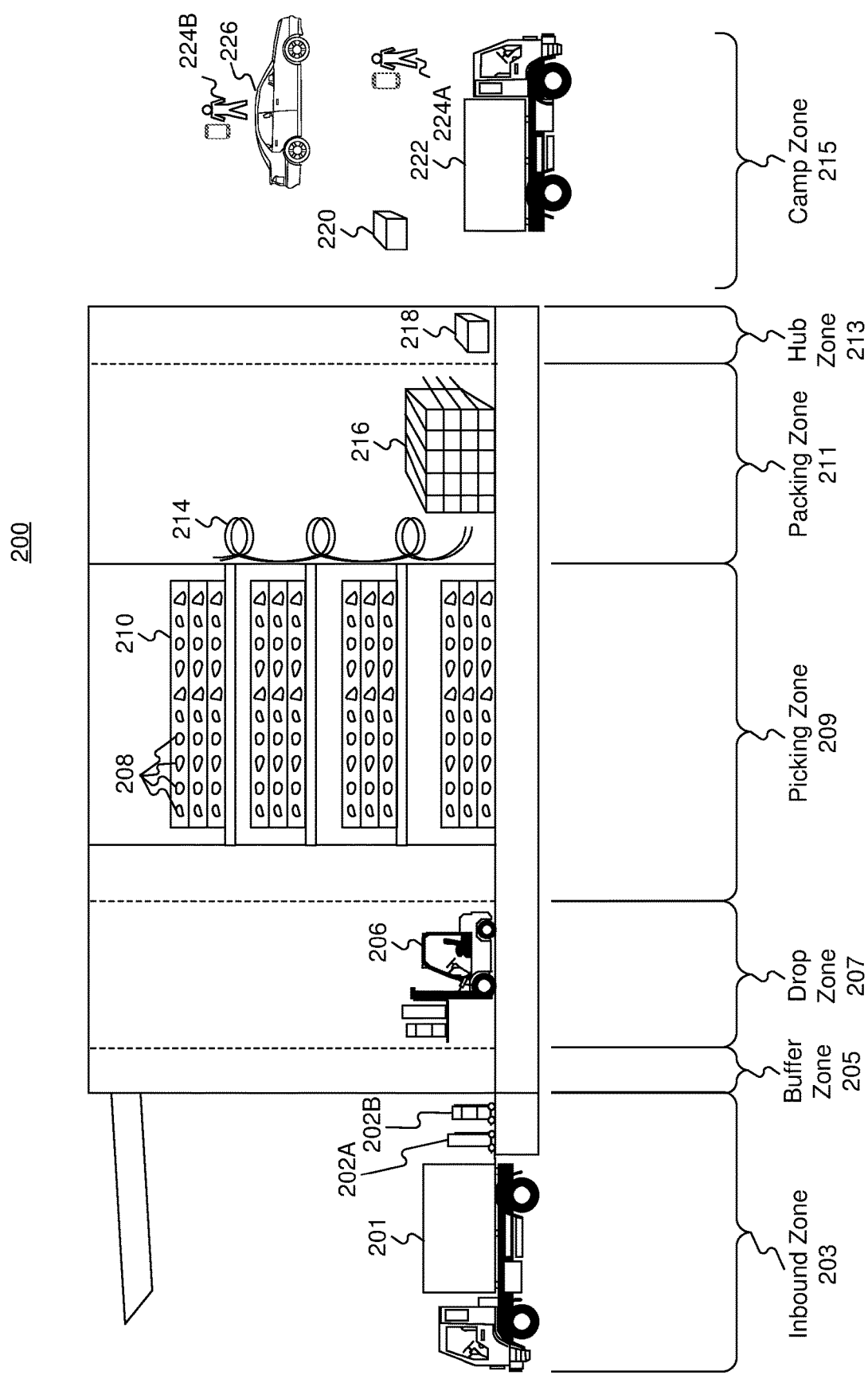
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones or locations, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
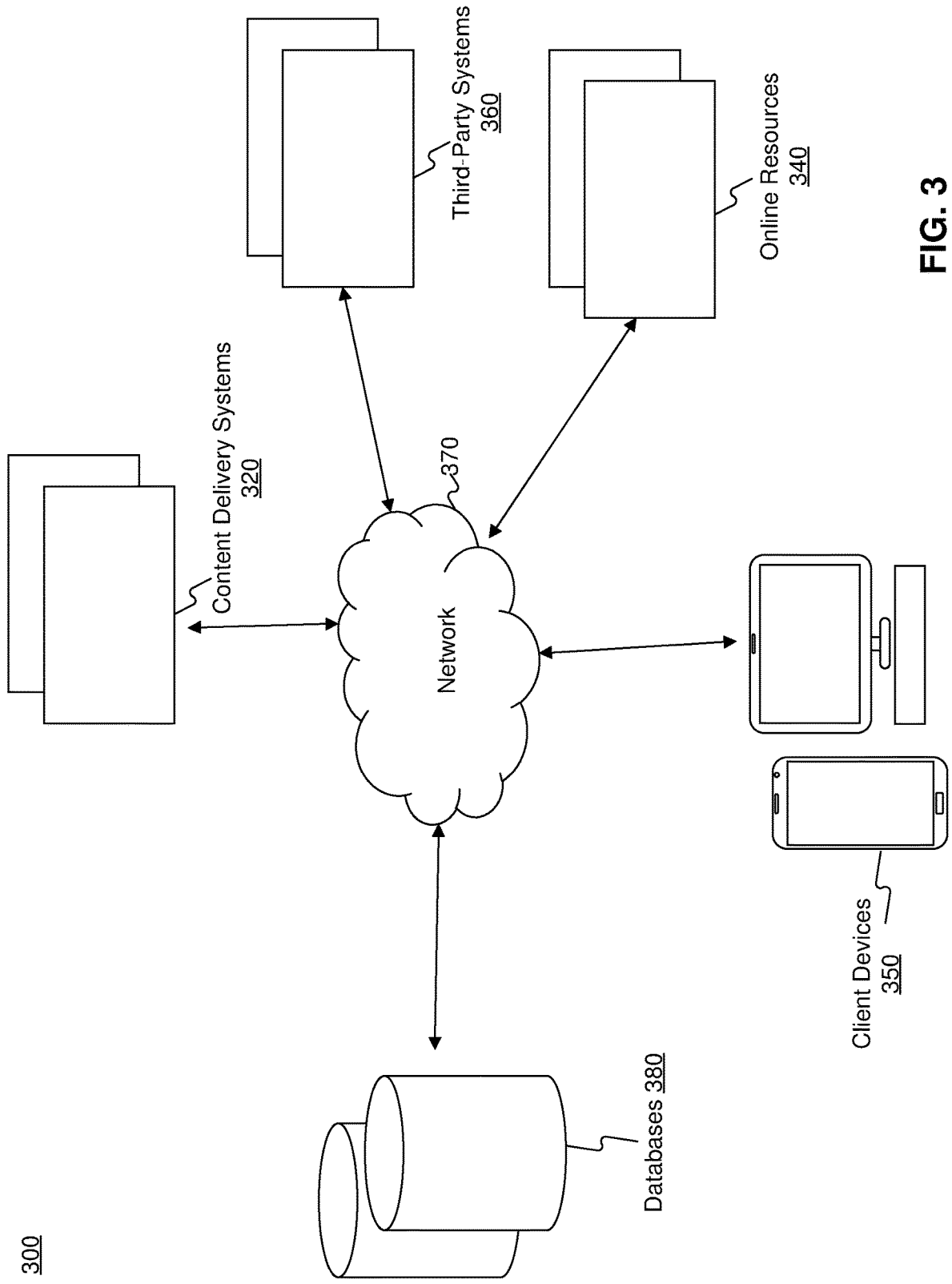
FIG. 3 is a schematic block diagram of an exemplary system, consistent with disclosed embodiments.

FIG. 3 is a block diagram of an exemplary system 300, consistent with disclosed embodiments. In system 300, a content delivery systems 320 may include servers, computer modules, and or data processing centers configured to process information requests from real-time client device's data streams to, for example, provide information about a virtual cart with selected items or lists of items associated with a user account. Content delivery systems 320 may provide information to resolve user requests and to generate customized webpages with information relevant to users of client devices. Content delivery systems 320 may also generate instructions to display or modify a webpage to include icons and hypermedia elements representative of items and/or interactive tools to collect instructions or user preferences. Further, content delivery systems 320 may codify packets of information, generate instructions for GUI display in client devices, and sort and store information. For example, content delivery systems 320 may store and manage in-memory data structures implementing a distributed in-memory key-value database. In such embodiments, content delivery systems 320 may supports different kinds of abstract data structures, such as strings, lists, maps, sets, sorted sets, HyperLogLogs, bitmaps, streams, and spatial indexes. Moreover, in some embodiments content delivery systems 320 may include modules for stream-processing software providing a unified, high-throughput, low-latency modules for handling real-time data feeds (e.g., real time quests for information). In such embodiments, content delivery systems 230 may use TCP-based protocols for exchanges of information and message sets.

System 300 may include, in addition to content delivery systems 320, online resources 340, client devices 350, third-party systems 360, and databases 380. In some embodiments, as shown in FIG. 3, components of system 300 may be connected to a network 370. However, in other embodiments components of system 300 may be connected directly with each other, without network 370. For example, databases 380 may be directly coupled to content delivery systems 320.

In some embodiments, content delivery systems 320 may be implemented with one or more of the components of system 100 (FIG. 1A). For example, content delivery systems 320 may include SAT system 101, external front-end system 103, FO system 113, SCM system 117, and/or WMS 119 (FIG. 1A). In other embodiments, content delivery systems 320 may be implemented with one or more independent servers configured to perform operations for providing content to client devices and/or generating webpages for client devices 350.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to display graphical user interfaces in webpages that include an item list with data or clusters provided by content delivery systems 320. Further, client devices 350 may be configured to perform operations according to instructions transmitted by content delivery systems 320, such as callback scripts or functions. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

In some embodiments, as further described below in connection to FIG. 4, client devices 350 may run applications specifically configured to interact with content delivery systems 320. Moreover, client devices 350 may store one or more accounts. For example, client devices 350 may store information about a customer's delivery preferences, the customer's location, customer account, and customer identification.

The disclosed embodiments are not limited to any particular configuration of client devices 350. For instance, a client device 350 may be a mobile device that stores and executes mobile applications to perform operations that provide functions offered by content delivery systems 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Databases 380 may include one or more computing devices configured with appropriate software to perform operations consistent with providing content delivery systems 320 data for generating clusters of items or packets of data for transmission to client devices 350. Databases 380 may include, for example, Oracle™ databases, Sybase™ databases, or other relational databases or non-relational databases, such as Hadoop™ sequence files, HBase™, or Cassandra™. Databases 380 may include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to content delivery systems 320 or online resources 340.

Databases 380 may be configured to collect and/or maintain data associated with user accounts or products to facilitate determination of available delivery options. For example, databases 380 may store information about user profiles for users of system 300. Further, databases 380 may store information about addresses, including delivery options available for the address. Databases 380 may also store previously generated clusters, to quickly respond to data requests from users and/or callback functions. Databases 380 may collect the data from a variety of sources, including, for instance, online resources 340 or third-party systems 360. Further, databases 380 may include information about client devices 350 operating systems. Databases 380 are further described below in connection with FIG. 5.

In some embodiments, third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to content delivery systems 320, such as a provider of services or a fulfillment center. Third-party systems 360 may also be connected to system 300 via network 370, but in other embodiments third-party systems 360 may include direct connections with some elements of system 300. For example, to minimize delays or network congestion, third-party systems 360 may be connected in a private network with content delivery systems 320. Further, third-party systems 360 may be configured to provide and/or request information from content delivery systems 320, or other elements of system 300. In some embodiments, while third-party systems 360 may also be coupled to network 370, they may not be clients of content delivery systems 320. Instead, third-party systems 360 may include systems that include information of users or clients of content delivery systems 320. For example, third-party systems 360 may include servers of delivery contractors, which may be used by content delivery systems 320 when a product delivery involves a third-party contractor.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
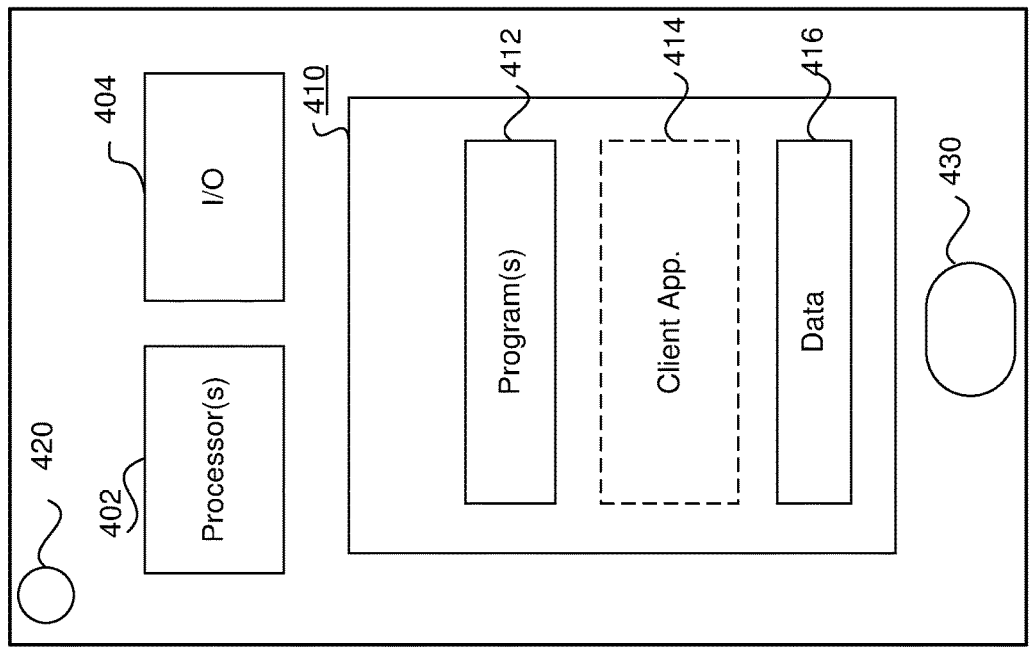
FIG. 4 is a block diagram of an exemplary client device, consistent with disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Lntel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with content delivery systems 320 and/or generate product information requests. In addition, client applications 414 may interpret instructions for generating graphical user interfaces (GUI) in client devices 350 or modifying displayed GUI. Memory 410 may also store data 416 that may be used by content delivery systems 320 to generate and maintain clusters of information.

In certain embodiments, memory 410 may store instructions for accessing or sending requests to content delivery systems 320. For example, memory 410 may include an application that communicates with content delivery systems 320 via TCP/IP. Moreover, other software components may be configured to request information from content delivery systems 320 or determine the location of client devices 350. For instance, these software instructions, when executed by processor(s) 402, may process information to display a list of items in a webpage. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with content delivery systems 320.

In some embodiments, client device 350 may also include a camera 420 that capture images and may be used for identification of a product that the user wants. Such identification may trigger requests for content information for display. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
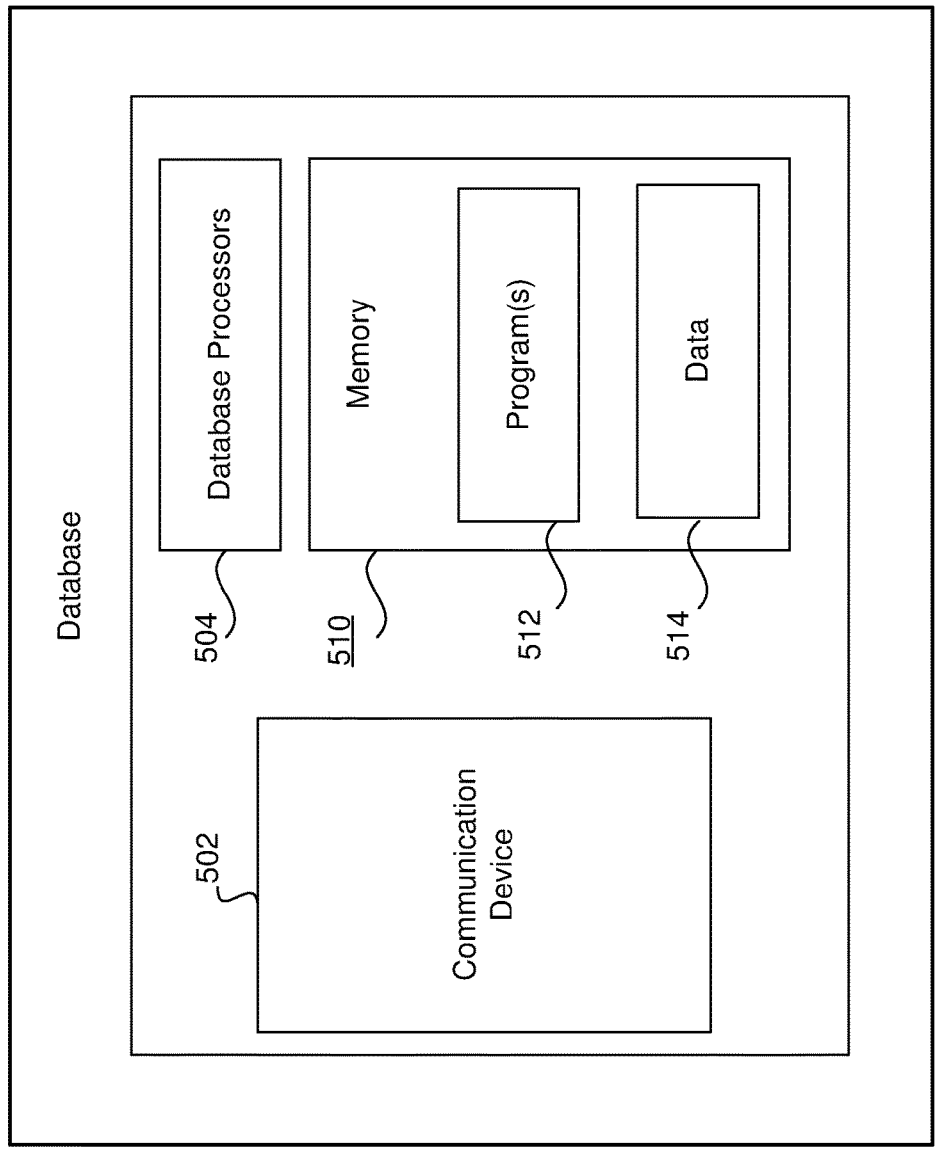
FIG. 5 is a block diagram of an exemplary database, consistent with disclosed embodiments.

Referring now to FIG. 5, there is shown a block diagram of an exemplary one of databases 380 (FIG. 3), consistent with disclosed embodiments. In some embodiments, databases 380 may be included in elements of system 100. For example, databases 380 may be part of external front-end system 103 or the WMS 119 (FIG. 1A).

Databases 380 may include a communication device 502, one or more database processors 504, and database memory 510 including one or more database programs 512 and data 514. Databases 380 may include NoSQL databases such as HBase, MongoDB' or Cassandra™. Alternatively, databases 380 may include relational databases such as Oracle, MySQL and Microsoft SQL Server.

In some embodiments, databases 380 may be servers, general purpose computers, mainframe computers, or any combination of these components. In some embodiments, databases 380 are included within other elements of system 300, such as content delivery systems 320. Other implementations consistent with disclosed embodiments are possible.

In some embodiments, databases 380 may include both non-relational and embedded databases. For example, databases 380 may include a non-relational database, such as an Hbase, and an embedded database, such as a RocksDB (e.g., a key-value store database).

Communication device 502 may be configured to communicate with one or more components of system 300 or system 100, such as online resources 340, content delivery systems 320, or SCM system 117. In particular, communication device 502 may be configured to provide content delivery systems 320 order information, user preferences and privileges, and/or previously transmitted clusters of information.

The components of databases 380 may be implemented in hardware, software, or a combination of both hardware and software. For example, although one or more components of databases 380 may be implemented as computer processing instruction modules, all or a portion of the functionality of databases 380 may be implemented instead in dedicated electronics hardware.

Database memory 510 may include programs 512, which may include instructions to generate clusters of records and or respond to information requests from client devices 350. Further, database memory 510 may include instructions for communications between elements of system 300. For example, database memory 510 may include instructions for communications between client devices 350 and content delivery systems 320. Further, programs 512 may include instructions to store information in real-time as it is processed by content delivery systems 320.

Data 514 may also be data associated with webpages, such as information of online resources 340, or user accounts from client devices 350. Data 514 may include, for example, information relating to previously delivery clusters, items in a virtual cart, or user visualization preferences. Data 514 may also include content files and accumulation variables to evaluate capacity of fulfillment centers and order availability.

Figure 6:
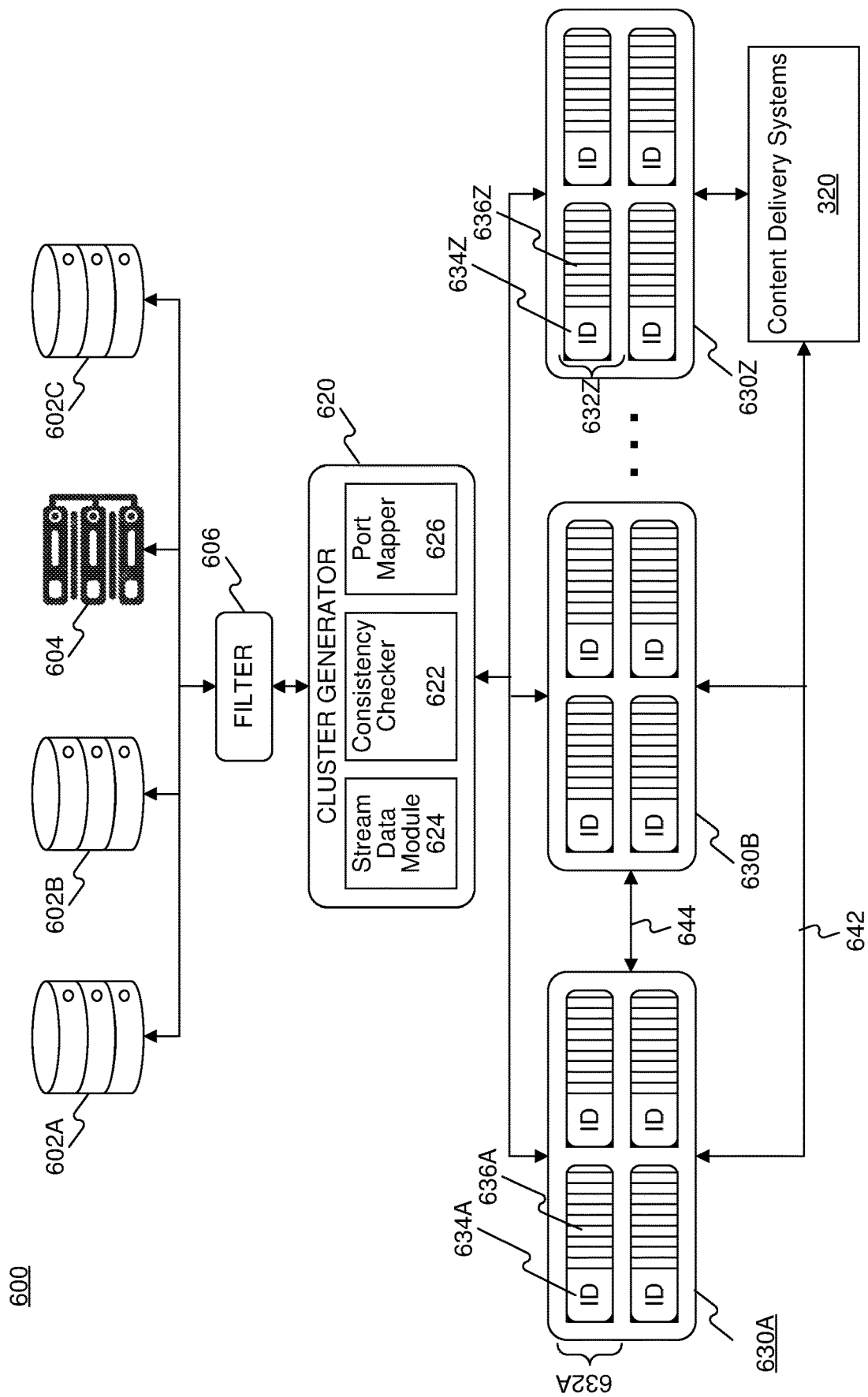
FIG. 6 is a block diagram of an exemplary cluster generation system, consistent with disclosed embodiments.

FIG. 6 is a block diagram of an exemplary cluster generation system 600, consistent with disclosed embodiments. Cluster generation system 600 may include data centers 602A-C and servers 604 connected to a cluster generator 620. In some embodiments, as shown in FIG. 6, data centers 602A-C and servers 604 may connect to cluster generator 620 through a filter 606. In some embodiments cluster generator 620 may be part of, or be connected to, content delivery systems 320.

Data centers 602A-C may represent may include redundant or backup components and infrastructure for power supply, data communication connections, environmental controls (e.g. air conditioning, fire suppression) and various security devices. In some embodiments, data centers 602A-C may support online store operations, such as storing user accounts, processing credit card transactions, and/or connecting vendors with clients. Similarly, servers 604 may include infrastructures that provide various functionalities, such as sharing data or resources among multiple clients, or performing computation for clients. In some embodiments, servers 604 may include servers of an online retail operation (such as external front end system 103 in FIG. 1A) providing services of account management or user content exchanges. In some embodiments, data centers 602A-C and servers 604 may be part of online resources 340, third-party system 360, and/or databases 380 (FIG. 3).

Filter 606 may include a computer program, subroutine, or software module to process a data stream and produce another stream with selected data. Filter 606 may be setup to reduce processing burden and expense by cluster generator 620. For example, filter 606 may be setup to filter out all information unrelated from records that cluster generator 620 needs to process. For example, in some embodiments cluster generator 620 may only generate clusters of items for display in a landing page of a mobile device website. In such embodiments, filter 606 may be configured to filter out all information unrelated to items. For instance, filter 606 may be configured to screen headers of information and discard information related to transactions, user feedback, and/or other information that is not relevant for clustering items. In some embodiments, filter 606 may also selectively remove certain information based on their characteristics. For example, because records of items are normally within a range of data file size, filter 606 may be configurable to filter out any information not within the expected range for item information.

Cluster generator 620 may be implemented with hardware or software and be configured for generation of clustered records or data sets. In some embodiments, cluster generator 620 may be part of content delivery systems 320 (FIG. 3) and be configured to generate data structures where data is automatically sharded across multiple nodes. For example, cluster generator 620 may automatically split datasets among multiple nodes. Further cluster generator 620 may generate redundant partitions providing some degree of availability during partitions, which may allow clients of the cluster to continue operations even if some nodes fail or are not able to communicate.

In some embodiments, cluster generator 620 may generate clusters using in-memory data structures implemented through in-memory key-value databases with optional durability. For example, cluster generator 620 may generate clusters using a remote dictionary server method and leverage multiple cache memory spaces to increase speed of communication. In such embodiments, cluster generator 620 may use memory positions of a data base as storage and as cache at the same time. Further, cluster generator 620 may employ data structures in which data is always modified and read from the main computer memory, stored on disk in a format that is unsuitable for random access of data, or stored in temporary memories only to reconstruct the data back in memory once the system restarts. Further, cluster generator 620 may use fork system calls, to duplicate the process holding the data, so that a parent process continues to serve clients, while a child process creates a copy of the data on disk. Through these configurations, cluster generator 620 may provide enhanced redundancy during the generation and transmission of website content, creating portioned copies of transmitted that both enhance speed and consistency of transmissions while maintaining data safety and security.

Cluster generator 620 may include a stream data module 624, a consistency checker 622, and a port mapper 626. Stream data module 624 may include hardware or software configured to process streams of data. For example, stream data module 624 may include stream-processing software that provides a unified, high-throughput, low-latency platform for handling real-time data feeds. In some embodiments data centers 602A-C may provide data feeds of information to cluster generator 620. For example, data centers 602A-C may continuously provide information of items being selected by users to be placed in a virtual cart. In such embodiments, stream data module 624 may connect to the data centers 602A-C, or to filter 606, and use a binary TCP-based protocol that employs a "message set" abstraction to form groups of messages that reduce the overhead of the network roundtrip. Thus, stream data module 624 may allow the generation of larger network packets and/or contiguous memory blocks to turn a stream of random message writes into linear writes that can be processed by cluster generator 620.

Consistency checker 622 may include software or hardware tools to proof consistency of clusters and nodes, or a backup. Consistency checker 622 may perform checks between nodes, relationships, properties, types and tokens. Consistency checker 622 may also perform checks on indexes by comparing content with the store. For example, consistency checker 622 may check port mapper 626 against previous versions or master tables. Further, consistency checker 622 may perform physical structure check on indexes, check on labels associated with notes or clusters, and verify record ownership and permissions. In some embodiments, consistency checker 622 may be configured to generate consistency reports. For example, when consistency checker 622 does not find errors, it may exit cleanly and not produce a report. If consistency checker 622 finds errors, it may exit with an exit code and write a report file with a name on the format inconsistencies.

In some embodiments, consistency checker 622 may support synchronous writes in different nodes or clusters by implementing WAIT commands. For example, consistency checker 622 may monitor incoming data in stream data module 624 and synchronize writings. Alternatively, or additionally, consistency checker 622 may enforce master-slave relationships between nodes or cluster to correct records based on master ledgers.

Port mapper 626 may include software or hardware for controlling communications within nodes of cluster generator 620. Port mapper 626 may store tables and/or matrices of ports associating nodes with the TCP ports. Port mapper 626 may run programs for directing traffic between nodes and/or between data centers 602A-C and servers 604 and elements of cluster generator 620. Port mapper 626 may be configured to "open" and "close" ports and establish firewalls, which determines which types of traffic are allowed.

Cluster generator 620, employing stream data module 624, consistency checker 622, and port mapper 626, may generate and maintain data clusters that store and organize records associated with users. For example, as further described in connection with FIG. 13, cluster generator 620 may generate clusters with information of items users have selected for a virtual cart or items a user has stored in a list. For example, as shown in FIG. 6, cluster generator 620 may generate data structures include a plurality of nodes 630A-630Z including a plurality of clusters 632A-Z. The literals used in reference numbers for nodes 630A-630Z and clusters 632A-Z only indicate there may be a variable number of nodes and clusters. These literals do not indicate there are twenty six nodes or clusters. The literal numbers along the reference numbers for nodes 630A-Z and clusters 632A-Z are only to indicate a variable number of clusters and nodes and not a specific count. Nodes 630A-Z may be distributed between different memory spaces or databases and may be balanced based on consistency checker 622. Each one of the clusters 632A-Z may include a unique pointer 634A-Z and a plurality of records 636A-Z. Thus clusters 632A-Z may include corresponding unique pointers 634A-Z and records 636A-Z. Like with nodes 630A-Z and clusters 632A-Z, the literals accompanying unique pointers 634A-Z and records 636A-Z only indicate variables and not a specific number. Further, as further described in connection with FIG. 8, each one of the clusters 632A-Z and each one of the records 636A-Z may be associated with metadata and metadata fields. For instance, based on the arrangement of data created by stream data module 624, cluster generator 620 may generate a plurality of clusters 632A-Z and assign each of them to nodes 630A-Z.

Further, as shown in FIG. 6, each one of the nodes may be assigned at least two ports by port mapper 626. Each of nodes 630A-Z may have two TCP connections open, one client port 642 (for content delivery systems 320) and one cluster bus port 644 connection with other nodes. Such cluster bus port 644 may be a high port that is configured as a node-to-node communication channel using a binary protocol. Cluster bus port 644 may be used by nodes for failure detection, configuration update, and failover authorization. In some embodiments, port mapper 626 may prevent communication of clients of the cluster, such as content delivery systems 320, with the cluster bus port 644. For example, port mapper 626 may firewall cluster bus port 644 from non node communication.

In some embodiments, cluster bus port 644 may connect each node to other available nodes and client port 642 may communicate with clients and are configured to be open to clients that need to reach the cluster, plus all the other cluster nodes (that use the client port for keys migrations). Moreover, cluster bus port 644 may use a different, binary protocol, for node to node data exchange, which is more suited to exchange information between nodes using little bandwidth and processing time to minimize bandwidth consumption and minimize response times.

Additionally, or alternatively, nodes 630A-Z may use an inconsistent hashing based on "sharding" where every key is conceptually part of a hash slot. Each node 630A-Z may be assigned a subset of the hash slots. This allows to add and remove nodes 630A-Z easily. Because moving hash slots from a node to another does not require to stop operations, adding and removing nodes, or changing the percentage of hash slots hold by nodes, does not require any downtime. This configuration also allows support of multiple key operations if the keys involved into a single command execution.

Cluster generation system 600 may enable creating data structures that support content delivery systems 320 and allow them to respond to data requests using a pagination systems (e.g., through unique pointers 364). Such clustering of information and segregation of data using a secure and redundant memory organization based on cached information, allows content delivery systems 320 to quickly respond to page requests and minimize landing page loading times by providing data in clusters 632A-Z, improving response time while minimizing bandwidth consumption.

Figure 7:
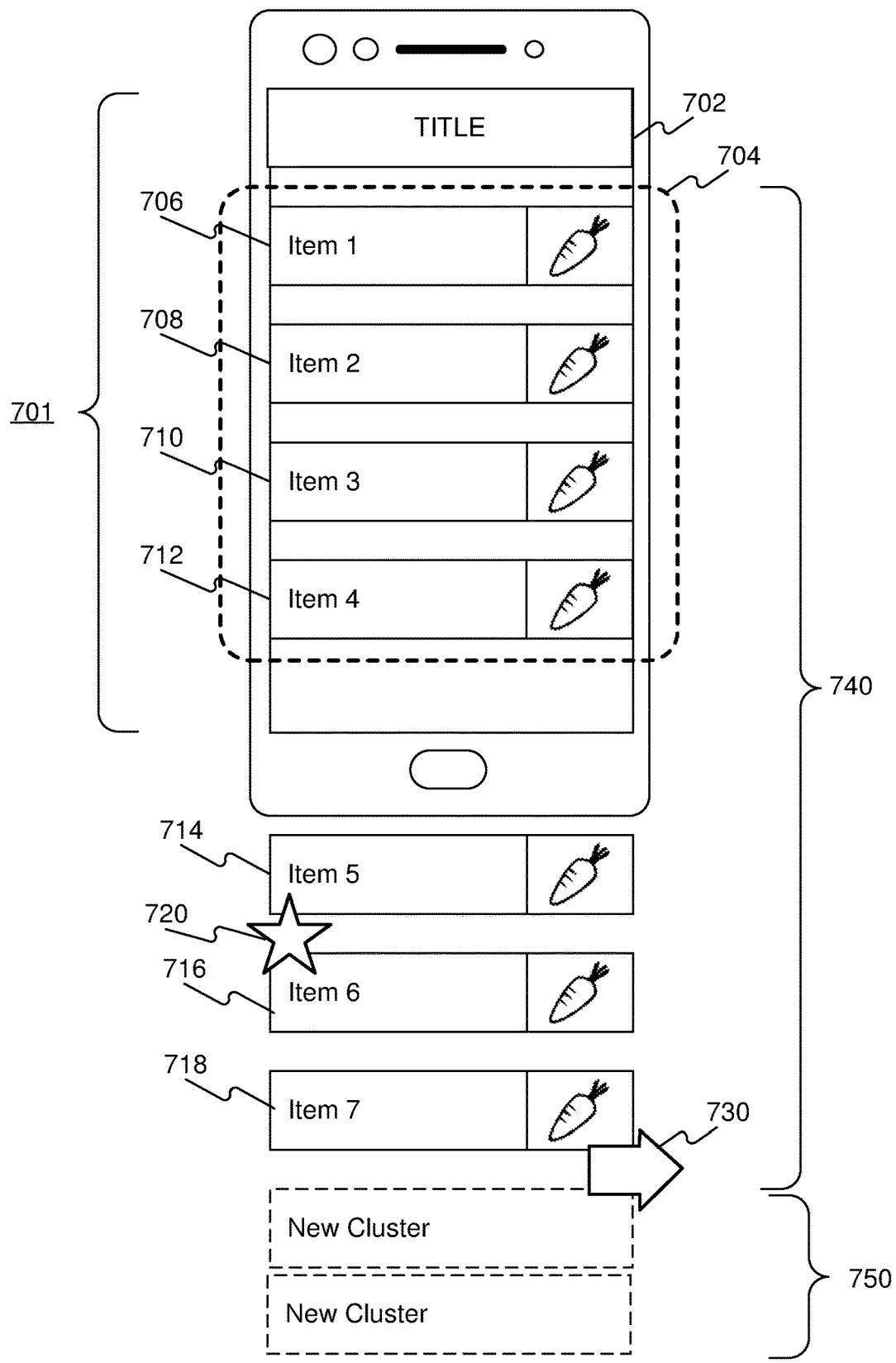
FIG. 7 is a representation of website loading using pagination clusters, consistent with disclosed embodiments.

FIG. 7 is a representation of website loading 700 using pagination clusters, consistent with disclosed embodiments. As shown in FIG. 7, a mobile device (e.g., one of client devices 350) may display a landing page 701 including a title 702 and multiple items. For example when a user requests to view a list of items, such as a selection of a virtual cart icon, client devices 350 may receive a transmission packet with information and instructions to display a landing page 701, which may be a Cart page. The items displayed in the mobile device may be determined by a display area 704, which may be based on the screen size of the client device. In the example shown in FIG. 7, four items can be displayed within the display area 704. Thus the landing page 701 is configured to load (e.g., load in cache memory) and display a first item 706, a second item 708, a third item 710, and a fourth item 712. In addition, to the visible items, additional non-visible items may be loaded while loading landing page 701. To create a cleaner user experience, client devices 350 may load not only the visible items, but also include items that will initially fall outside display area 704. In such embodiments, client devices 350 may additionally load a fifth item 714, a sixth item 716, and a seventh item 718.

As shown in FIG. 7, each one of items 706-718 may include an image and item information. Further, each one of the items may include a hyperlink or button functions that may take a user to a different web page or request additional information from a server, as further discussed in connection with FIGS. 10 and 15. In some embodiments, each one of items 706-718 may include functions that are triggered on click (i.e., on click events). The group of items 706-718 may be the cluster of items received from, for example, content delivery systems 320. In such embodiments, the clustered data may be received from in a single transmission and loading items 706-718 may include loading clustered list 740 for display in client devices 350. For example, in some embodiments client devices 350 may be configured to load first three to eight items while landing. In other embodiments, client devices 350 may configured to consistently load six items while loading.

In some embodiments, landing page 701 may also include a callback script that specify a triggering point 720. The callback script may be invisible to the user and may monitor use actions while landing page 701 to request additional webpage data. For example, the callback script may monitor user scrolling, clicks, and/or scrolling speed. In some embodiments, callback script may monitor whether a user has scrolled past triggering point 720, which may be defined based on one item of clustered list 740. For example, callback script may place triggering point 720 at a second to last item in of clustered list 740. In such embodiments, callback script may include scrolling triggered functions that get executed when a user reaches or passes the triggering point 720.

Further, in certain embodiments, callback script may include adaptable functions that place triggering point 720 based on network status, user behavior, and/or processing capabilities of client devices 350. To provide a seamless experience and be able to load items quickly as a user scrolls through landing page 701, callback script may adapt the trigger points based on local and network conditions. For example, callback script may be configured to monitor user scrolling speed. If the user has a quick scrolling speed, callback script may modify the location of triggering point 720 from the second to last item to an earlier item (e.g., the third item or the first time) or use a different type of triggering mechanism (such as requesting additional data as soon as clustered list 740 is loaded). In such embodiments, triggering point 720 may be a function of scrolling speed, network connection, and processing capabilities of the device. Similarly, to facilitate providing a fluent experience to users and minimize delays when loading different clusters, callback script may adapt the scrolling triggering point 720 when the network connection is slow or has a high bit error. Thus, callback script may include operations of determining the network speed and modifying triggering point 720 to an earlier point. Also, callback script may adjust a location of triggering point 720 based on processing capabilities of client devices 350. For example, based on the loading time it took client devices 350 to render clustered list 740, the callback script may adjust the location of triggering point 720. For devices that have low processing capabilities, callback script may place triggering point 720 closer to the beginning of clustered list 740. In contrast, if processing power of the device is not a problem, callback script may adjust to position of triggering point 720 later, closer to the end of clustered list 740. Thus, callback script may have the ability to select a location for triggering point 720 dynamically. Such ability may improve both the functioning of computing devices in client devices 350 and network congestion because manipulating a position of triggering point 720 may allow to calibrate required refreshing periods so there is no lag or delay while the user is scrolling while avoiding overburdening the network with too many, or too frequent, requests for additional information.

In some embodiments, callback script may also define a transition point 730. Transition point 730 may act as a second trigger for requesting additional webpage data or transmitting instructions to a sever. For example, callback script may include functions that get triggered when the user reaches the end of clustered list 740. These functions may include, for example, clearing cache memory, transmitting a confirmation message, and/or calculating variables (such as scrolling speed). Further, in some embodiments, callback script may define transition point 730 as a second option to request a new cluster. As a fallback position in case functions related with triggering point 720 do not execute properly, callback script may determine that at transition point 730 a new request must be sent and/or request information from an alternative connection.

Through the combination of triggering point 720 and transition point 730, the callback script may provide means for controlling when and how often new clusters need to be fetched from a server to display items in based on clusters. For example, callback script may configure client devices 350 to request and load new clusters 750 when reaching triggering point 720 and/or transition point 730. Thus, the callback script may allow client devices 350 to load other items, pages, or clusters by scrolling down through the screen. Such arrangement minimizes latency when loading landing page 701 and creates a better user experience.

Although callback script has been discussed as having been triggered based on scrolling functions and triggering point 720 and transition point 730, callback script may also have other triggering mechanism. For example, callback script may use timers to trigger the requests for new data. In such embodiments, callback script may include a timer that requests new clusters 750 or pages after a timer expires. Like with triggering point 720, the timer may be setup dynamically, based on scrolling speed, bandwidth, and/or device processing capabilities. Further, in some embodiments, the callback script may combine timer and scrolling functions. Yet in other embodiments, callback script may use other triggering events based on navigation functions such as number of taps on the screen or swiping.

The method and arrangement of website loading 700 may improve computer functionality because it allows optimization through parallelization by segregating the list to be displayed in packets or clusters that can be processed independently. Further, the ability to control positions of triggering point 720 and transition point 730 improves the technical field of website loading by providing flexibility of how, when, and how often load additional information in cache memory based on the particular conditions of the exchange. Thus, website loading 700 address technical challenges of minimizing latency, providing more uniform loading times, and reducing network congestion.

Figure 8:
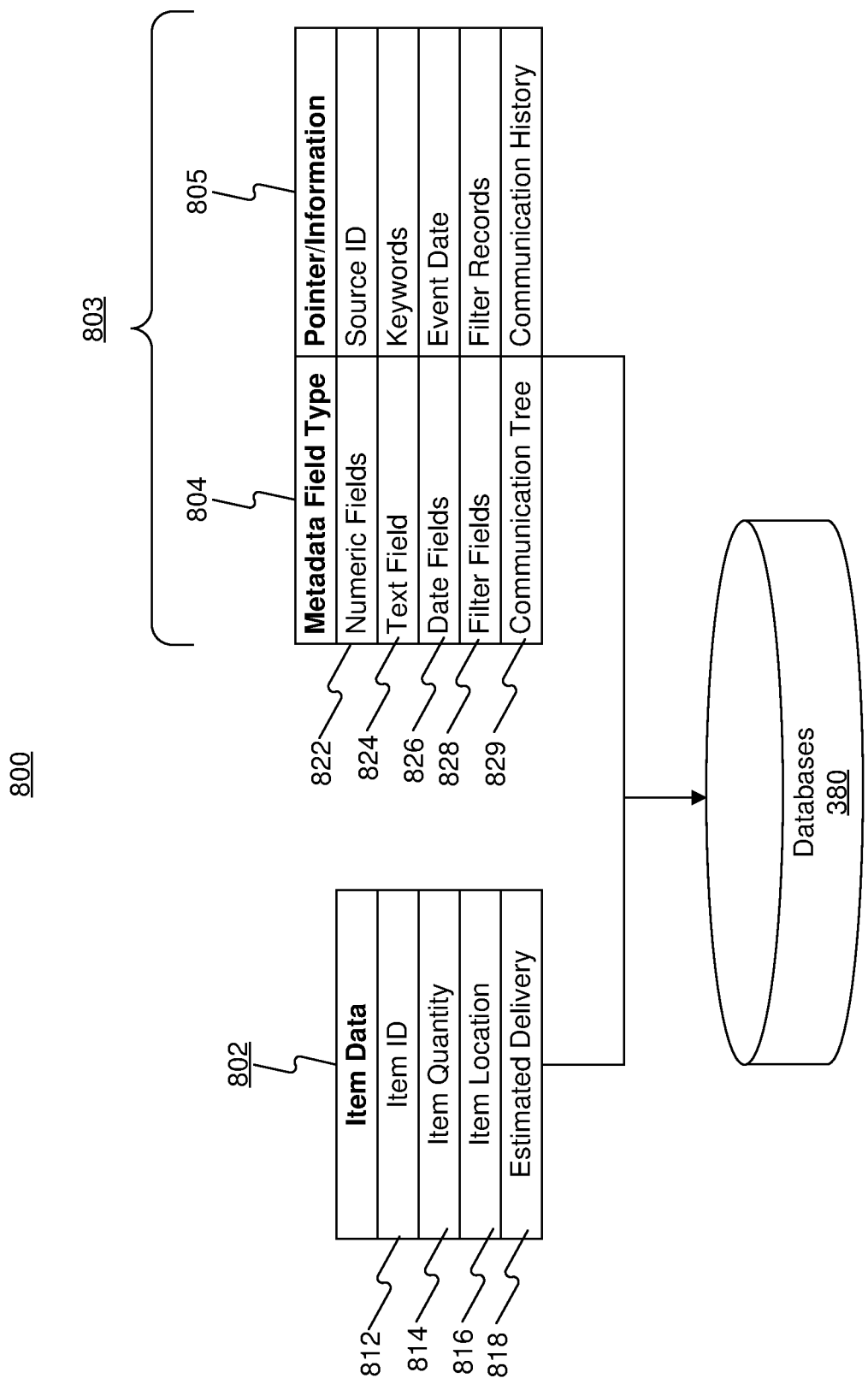
FIG. 8 is a block diagram of an exemplary database arrangement with data associated with metadata fields, consistent with disclosed embodiments.

FIG. 8 is a block diagram of an exemplary database arrangement 800 with data associated with metadata fields, consistent with disclosed embodiments. Cluster generator 620 (FIG. 6) may generate clusters of records based on metadata associated with the records. For example, cluster generator 620 may use metadata fields associated with the source of the record to sort and group records in nodes 630A-Z and clusters 632A-Z. FIG. 8 shows an example of data in records and their associated metadata.

Records transmitted by data centers 602A-C (FIG. 6) and clustered or processed by cluster generator 620 may include shopping items, list of items added to a cart, and/or search results. These records may include data 802 and metadata 803, which may include a plurality of metadata fields 804 with pointers 805. In some embodiments, the records may include information necessary for an SRP (FIG. 1B). For example, record data 802 may include item picture, data, and availability. Alternatively, or additionally, record data 802 may include pictures of products, respective prices for each product, or information relating to enhanced delivery options for each product, PDD, weight, size, offers, discounts, or the like. Record data 802 may also include delivery options, cutoff times for delivery options and/or hypermedia elements requesting user input. In some embodiments, record data 802 may include memory allocations for an item ID 812, item quantity 814, item location 816, and estimated delivery (or PDD) 818. In some embodiments, record data 802 and record metadata 803 may be stored in one or more of databases 380 (FIG. 3).

Metadata fields 804 may include information associated with the record data 802 and capture this information in the plurality of metadata fields 804. For example, metadata fields 804 may include number metadata fields 822 that includes codified identification numbers. Further, number metadata fields 822 may include pointers to numeric values representing a product categorization and/or a source of the product (associated with a fulfilment center). Metadata fields 804 may also include a text field 824, which may include keywords associated with the record (such as "perishable" or "subscription"). Metadata fields 804 may also include a date field 826, which may include dates associated with the record, describing for example, the date a user selected an item or the latest product availability update from the fulfilment center. Further, metadata fields 804 may include filter metadata fields 828, which may describe filters applied to the record. For example, in embodiments in which filter 606 or stream data module 624 (FIG. 6) modify the records transmitted by data centers 602A-C, filter metadata fields 828 may record the information of the filters that have been applied and when were they applied. Moreover, metadata fields 804 may include a communication tree field 829, which may record the different nodes, clusters, and/or servers that are associated with a record.

Record data 802 and record metadata 803 may allow clustering of records and organizing them in distributed nodes to facilitate pagination and transmission of website data to client devices. For example, in some embodiments cluster generator 620 may use number fields 822 to organize and categorize records based on their associated fulfilment center to generate clusters of records. In such embodiments, cluster generator 620 may cluster records when they are associated with the same fulfilment center. Such categorization may facilitate identifying information quickly and arranging information based on geographical locations. Alternatively, or additionally, clusters may be generated for pagination based on combinations of metadata information. For example, clusters may be generated based on the combination of information in data fields 826, filter fields 828 and communication tree 829.

Figure 9:
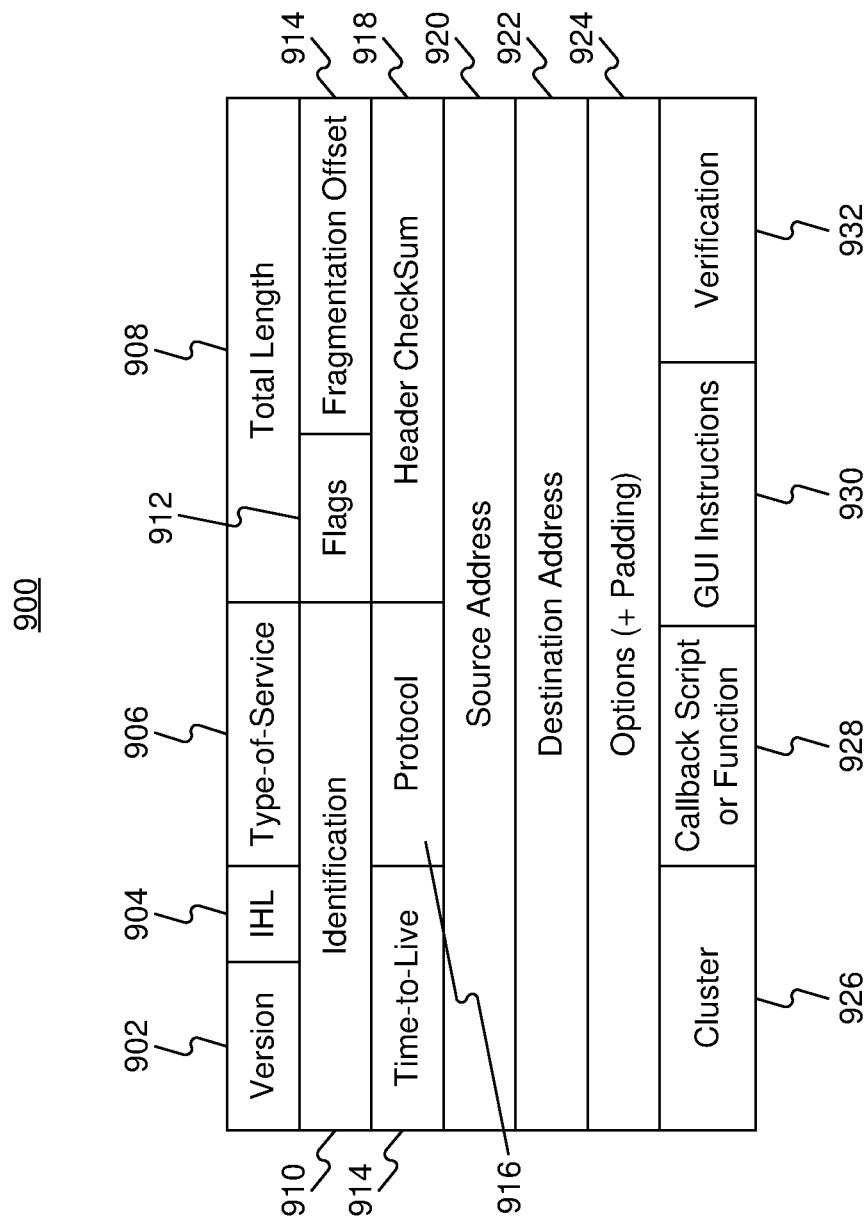
FIG. 9 is a block diagram of an exemplary transmission packet, consistent with disclosed embodiments.

FIG. 9 is a block diagram of an exemplary transmission packet 900, consistent with disclosed embodiments. In some embodiments, transmission packet 900 may include layers according to TCP/IP protocols including an application layer (e.g., FTP, Telnet, HTTP), a transport layer (e.g., TCP or UDP), an internet layer (IP), and a network access layer (e.g., Ethernet, FDDI, ATM).

Transmission packet 900 may include a header with a version 902, an Internet Header Length (IHL) 904, a type of service 906, a total length 908, an identification 910, flags 912 and a fragmentation offset 914. In addition, the header of transmission packet 900 may include a time to live value 914, a protocol 916, and a header checksum 918. Moreover, the header may include a source address 920, a destination address 922, and options 924, which may be terminated with an EOL (End of Options List) option. Transmission packet 900 is only exemplary and it is not required. For example, the particular order described in transmission packet 900 is not required and alternative arrangements are possible.

Transmission packet 900 may also include a data or payload which may include a cluster 926, a call script 928, GUI instructions 930, and verification instructions 932. Cluster 926 may include items that have been clustered (for example by cluster generator 620) and will be displayed on a landing page or in response to a request for additional information. Additionally, or alternatively, cluster 926 may include items, and item data, for display in client devices 350. For instance, cluster 926 may include a listing of items and record data 802 (FIG. 8), clustered list 740 (FIG. 7), and/or on of clusters 632A-Z (FIG. 6). Call script 928 may include programs or functions to perform the operations described in connection with website loading 700. Call script 928 may include navigation triggered functions (such as a scrolling triggered function) and a callback message that may configure the client devices 350 to request additional clusters for display as a user navigates in the landing page.

GUI instructions 930 may include instructions for display of a landing page, such as landing page 701 (FIG. 7), or display of the list based on information in cluster 926. For instance GUI instructions 930 may include instructions to load items in cache memory and display items in display area 704. For example, GUI instructions 930 may include operations to identify an operating system (OS) and based on the operating systems using libraries of OS in client devices 350 that interface with the monitor/display of client devices 350. For example, GUI instructions 930 may call for GUI libraries and interact with those libraries of the operating system to interact with the monitor. GUI instructions 930 may also include the information to be displayed in client devices 350. For example, GUI instructions 930 may include images, hyperlinks, and features of different objects to be displayed. In some embodiments, GUI instructions 930 may include instructions to display windows, pull-down menus, buttons, scrollbars, iconic images, wizards, other icons, and the mouse to enable users to interact with the operating system or application.

Further verification instructions 932 may include instructions for verifying generated GUIs and/or the item information. For example, verification instructions 932 may include instructions for GUI observation and evaluation. GUI observation may include checking screen, checking GUI objects (exist, enabled, etc.), and check GUI objects' data (text displayed, item selected, etc.). The evaluation may include instructions for assessment of Pass/Fail criteria for GUI observations.

Transmission packet 900 may provide instructions for loading and displaying a landing page, such as landing page 701 (FIG. 7), and include scripts or functions for loading additional items. Such configuration of segregated information and transmission of clusters of data, rather than a single transmission with the full page information, may reduce network congestion and address technical challenges to create fast loading landing pages and smooth interactions during web browsing.

Figure 10:
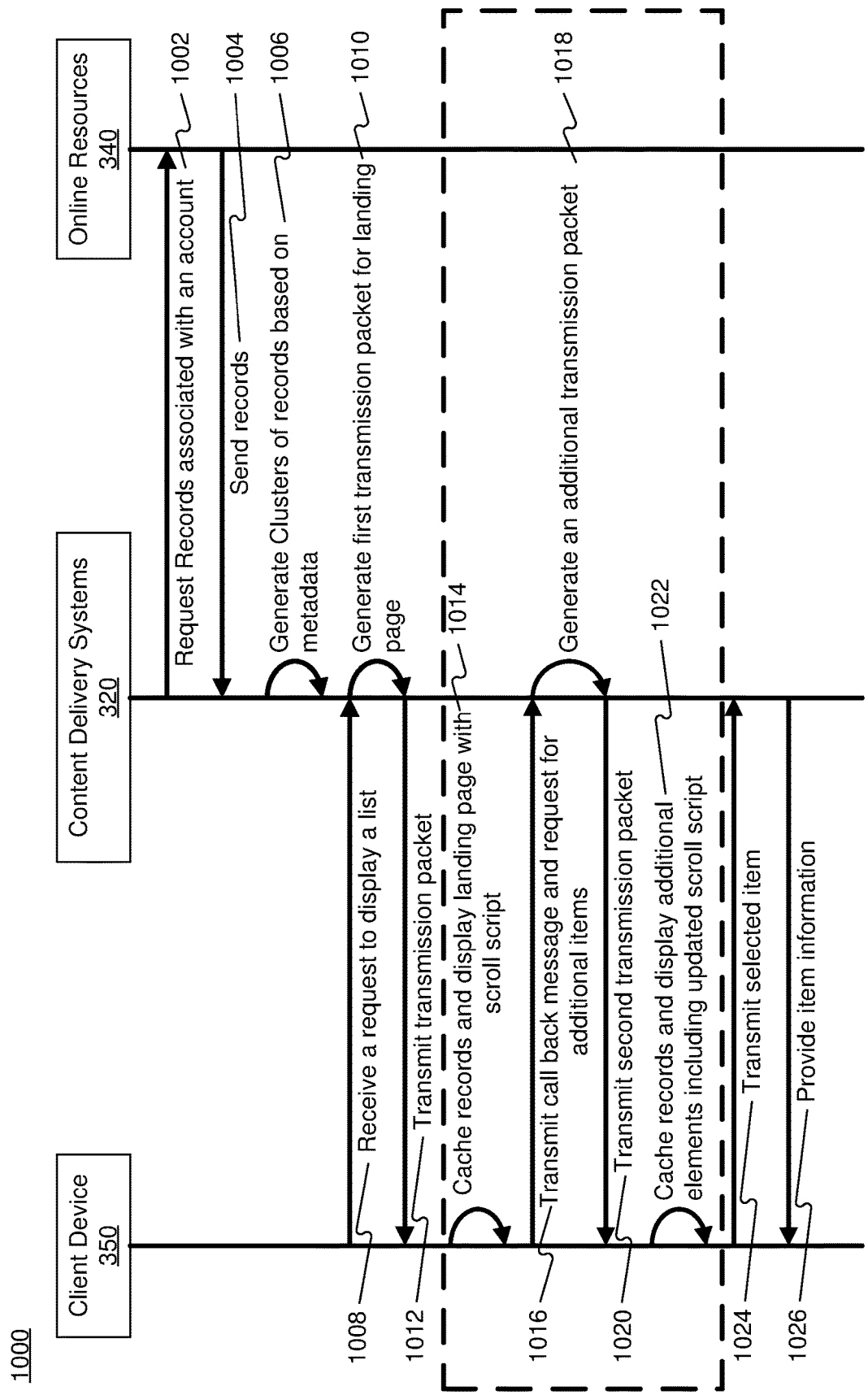
FIG. 10 is an exemplary process flow diagram illustrating a website loading process, consistent with disclosed embodiments.

FIG. 10 is an exemplary process flow diagram illustrating a website loading process 1000, consistent with disclosed embodiments. In some embodiments, as shown in FIG. 10, different elements of system 300 (FIG. 3) may perform specific steps of flow 1000. For example, components of content delivery systems 320 may perform one or more steps but other systems, while client devices 350 and online resources 340, may perform other steps. In other embodiments, however, alternative elements of system 300 may perform the described steps (e.g., databases 380 may perform certain steps) or a single element of system 300 may perform the described steps.

In step 1002, content delivery systems 320 may request records associated with user accounts. For example, content delivery systems 320 may request items that a user has selected to be in its virtual cart from online resources 340. Alternatively, or additionally, content delivery systems 320 may request a list of items that a user has pre-selected for its account. For example, online resources 340 may store items a user has selected for future purchase. Online resources 340 may store a saved item list, a wish list, and/or elements added to a virtual cart. In some embodiments, online resources 340 may store both data and metadata associated with each one of the items a user has selected. As discussed in connection with FIG. 8, online resources 340 may store record data 802 and record metadata 803 (FIG. 8) and transmit that information to content delivery systems 320 upon request. Moreover, while in some embodiments content delivery systems 320 may make the request to online resources 340 (as shown in FIG. 10), in other embodiments content delivery systems 320 may make the request to databases 380 and/or third-party systems 360.

In step 1004, online resources 340 may send the requested records. For example, online resources 340 may send the items that are associated with the account, that the user searches, or that the user has added to a virtual cart. The records may include item descriptions (such as price and location), images, and estimated delivery times. As previously discussed, the records may include record data 802 and record metadata 803 (FIG. 8). In some embodiments, online resources 340 may apply certain filters to the records transmitted to content delivery systems 320. For example, online resources 340 may filter out certain records based on metadata information and/or user preferences. Alternatively, or additionally, like it is described in FIG. 6, a filter may route communication between online resources 340 and content delivery systems 320 to minimize bandwidth utilization.

In step 1006, content delivery systems 320 may generate clusters of records based on metadata. As further described in connection with FIGS. 6 and 13, content delivery systems 320 may employ cluster generators and/or instances running in cluster mode to create clusters with a fixed number of records and balanced data file size in step 1006. For example, content delivery systems 320 may employ remote dictionary server methods and in-memory data structures to generate clusters based on in-memory key-value databases. Clusters generated in step 1006 may, for example, include nodes 630A-Z and clusters 632A-Z (FIG. 6) In addition, in step 1006 content delivery systems 320 may generate unique pointers 634A-Z and organize clusters with plurality of records 636A-Z based on their associated metadata.

In step 1008, one of client devices 350 may send a request to display a list. For example, one of client devices 350 may send a request for display of a cart page in a mobile device as a user navigates to cart page (as shown in FIG. 1D). In such embodiments, when a user navigates to cart page, client devices 350 may generate a request for a landing page displaying a list of items (e.g., the list of items in the user's cart that should be displayed). Thus, in step 1008 client devices 350 may generate requests to display lists and/or information for landing pages as a user navigates in an application or a web browser. Other operations may also trigger the requests to display a list of step 1008. For example, the request of step 1008 may be triggered when a user requests display of available items (e.g., single display page shown in FIG. 1C), a wish list, other items associated with the user, a user query, or inventory.

In step 1010, content delivery systems 320 may generate a transmission packet for a landing page requested by client devices 350. As further described in connection with FIG. 15, content delivery systems 320 may generate a transmission packet that includes a selected cluster (such as one of clusters 632A-Z) and a callback script or function with a navigation triggered function. For instance, in step 1010, content delivery systems 320 may generate a transmission packet like the one described in connection with FIG. 9, directed to the requesting one of client devices 350 and including a payload that includes cluster information (at least one of the clusters generated in step 1004), a callback script of function, GUI display instructions, and verification information. As further disclosed in connection with FIG. 11, the selected clusters used for the transmission packet of step 1010 may be selected based on the user location, preferences, and previously transmitted clusters. In addition, the callback script or function embedded in the transmission packet payload may include a navigation triggered function which configures client devices 350 to perform operations as the user navigates on client devices 350. For example, the callback script or function may include a scrolling triggered function that triggers certain operations once the user scrolls past a certain point, as discussed in connection with FIG. 7. Alternatively, or additionally, the callback script may include other navigation triggered function such as functions based on swiping, clicking, and/or changing the orientation of the device.

In step 1012, content delivery systems 320 may transmit the transmission packet generated in step 1010. For example, content delivery systems 320 may transmit the packet using TCP/IP protocols and route the transmission packet of step 1010 through and edge server. For example, content delivery systems 320 may transmit the packet of step 1010 through network 370.

In step 1014, one of the client devices 350 may cache the cluster and/or records in the transmission packet and show it to the user. In some embodiments, client devices 350 may also perform displaying operations according to GUI instructions of the transmission packet of step 1010.

In step 1016, client devices 350 may transmit a callback message to content delivery systems 320. In some embodiments, the transmission of step 1016 may be automated and transparent to the user and based on functions performed by the callback script. For example, client devices 350 may transmit the callback message based on scrolling triggering functions that configure client devices 350 to transmit the callback message requesting additional items for display as a user scrolls down through a list. Alternatively, or additionally, client devices 350 may transmit callback messages as a user navigates in a website or application and swipes or clicks different buttons. In some embodiments, a user of client devices 350 may not notice the callback script of function has been triggered and that client devices 350 is requesting additional information for display. Such embodiments allow improvement of the functioning of client devices 350 because it allows loading the landing page quickly, based on an initial cluster of items, and request additional items as the user navigates but without interrupting the user experience.

In step 1018, content delivery systems 320 may generate an additional transmission packet. For example, content delivery systems 320 may select a second cluster, based on the client devices 350 location, bandwidth, and the first clustered selected for the landing page, and generate a second transmission packet that includes the second selected cluster. In some embodiments, the second transmission packet may also include the callback script or function to continue increasing the number of items stored in cache memory. In some embodiments, the call back function in the second transmission packet may be adapted to, for example, get triggered in different points or change the request for clustered information.

In step 1020, content delivery systems 320 may transmit the second transmission packet. Like in step 1012, content delivery systems 320 may transmit the transmission pocket through an edge server and or network 370 (FIG. 3).

In step 1022, one of client devices 350 may cache records and display additional elements including the updated scroll script. Like in step 1014, display of the records may be based on instructions for GUI display contained in the transmission packet.

Steps 1016-1022 may be iterated additional times in process 1000, as a user continues navigating the webpage (e.g., scrolling through the list) until all elements in the list have been transmitted to the user or the user makes a selection of one of the displayed items.

In step 1024, one of client devices 350 may transmit a selected item to content delivery systems 320. For example, a user may stop scrolling and select one of the items that have been displayed in the screen. In such case, client devices 350 may transmit the selected item to content delivery systems 320 and/or request additional information. For instance, a user may select one of the items in a cart page to get move to a single display page (e.g., FIG. 1C) or an order page (e.g., FIG. 1E). In step 1026, content delivery systems 320 may provide the requested additional information for the selected item and GUI instructions to display the selected page or information.

Figure 11:
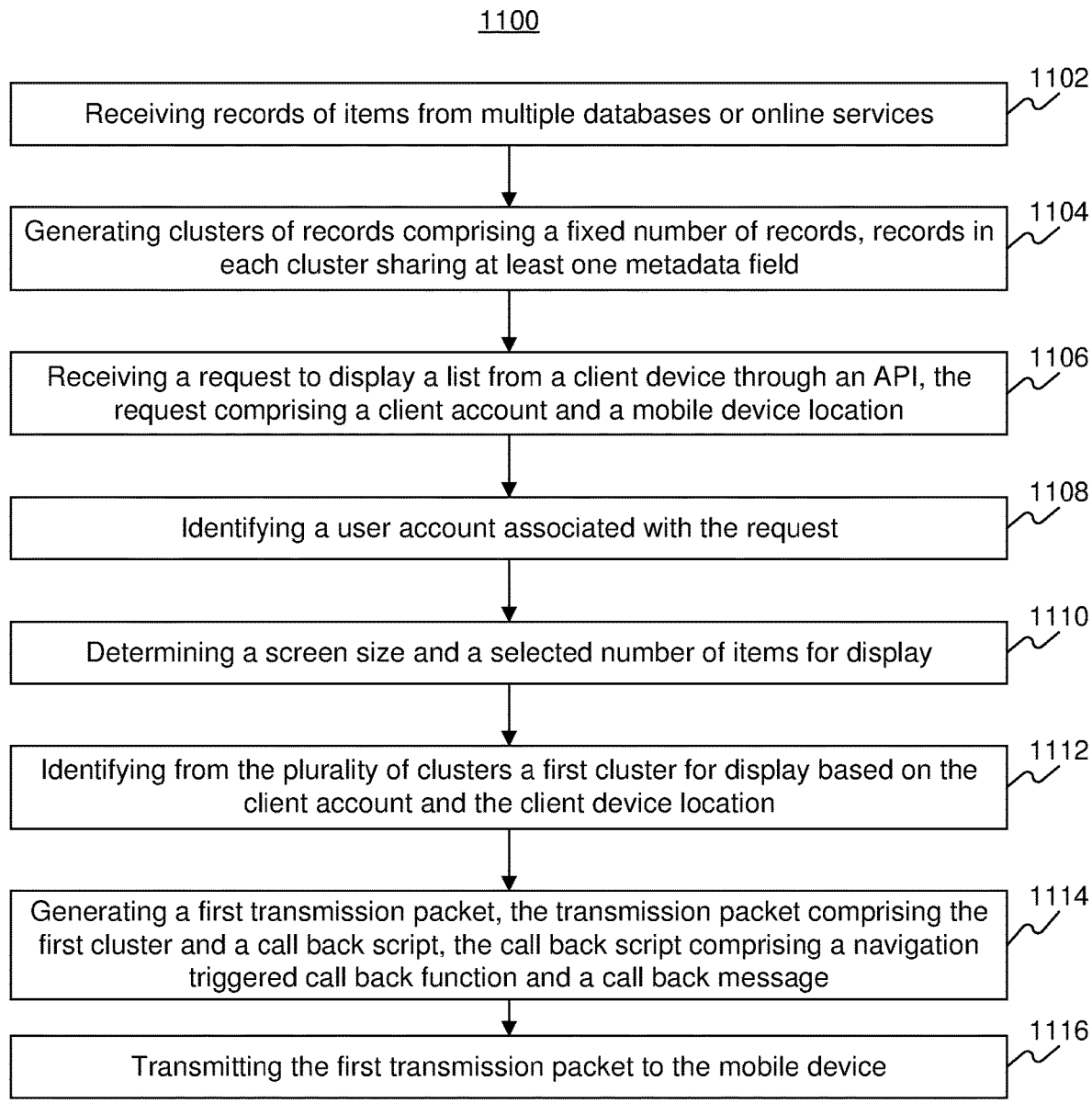
FIG. 11 is a flow chart of an exemplary process for transmitting transmission packets to a client device, consistent with disclosed embodiments.

FIG. 11 is a flow chart of an exemplary process 1100 for transmitting transmission packets to a client device, consistent with disclosed embodiments. In some embodiments, elements of system 300 may perform process 1100. For example, as disclosed in the steps description below, content delivery systems 320 may perform process 1100. Alternatively, or additionally, third-party systems 360 may perform process 1100, or parts of process 1100. Further, in other embodiments system 100, or parts of system 100, may perform process 1100. For instance, external front-end system 103 and/or FMG 115 may perform process 1100.

In step 1102, content delivery systems 320 may receive records of items from multiple databases or online services. For example, content delivery systems 320 may receive records from online resources 340, databases 380, and/or data centers 602A-C. As previously discussed the records may be filtered and may include both data and metadata.

In step 1104, content delivery systems 320 may generate clusters of records including a fixed number of records, records in each cluster sharing at least one metadata field. For example, content generator 620 may generate nodes 630A-Z and clusters 632A-Z based on metadata associated with each record received in step 1102. In some embodiments, the records of the at least one metadata field includes a product category metadata field and a database ID metadata field and clusters may be generated so the records in each cluster are retrieved from a unique database from databases 380 (FIG. 3). Further, content delivery systems 320 may have predetermined rules for cluster generation that are based on having clusters with balanced file sizes or a fixed number of records. In order to create more uniform transmissions, minimize bandwidth utilization, and facilitate data processing at both ends of the communication, clusters generated in step 1104 may have a fixed number of records (e.g., between three and eight) and each cluster having substantially the same file size. In some embodiments, the fixed number of records may be specified to six records to minimize required calculations and streamline cluster generation.

In step 1106, content delivery systems 320 may receive a request to display a list from a mobile device from an application programming interface (API), the request including a client account and a mobile device location. As described in connection to FIG. 10, the request may get generated as a user navigates in a website. In some embodiments, the request to display the list may include a request to display items in a virtual cart (e.g., such as the items in cart page shown in FIG. 1D). Items in the virtual cart may include items a user of client devices 350 has selected from a plurality of single display pages (FIG. 1C).

In step 1108, content delivery systems 320 may identify a user account associated with the request. And in step 1110, content delivery systems 320 may determining a screen size and a selected number of items for display. For example, based on information in the request of step 1106, content delivery systems 320 may determine whether the requesting one of client devices 350 is a tablet, a laptop, a smartphone, and/or smart watch.

In step 1112, content delivery systems 320 may determine a screen size and a selected number of items for display. For example, if client devices 350 is determined to be a tablet with a large screen, content delivery systems 320 may determine the size of the screen is large an determine that ten or more items will be displayed at the landing page. In contrast, if client devices 350 is determined to be a small smartphone, content delivery systems 320 may determine the size of the screen is small and determine only four or fewer items will be displayed at the landing page.

In step 1114, content delivery systems 320 may generate a first transmission packet, the transmission packet including the first cluster and a callback script, the callback script including a scrolling callback function. As further described in connection with FIG. 9, the transmission packet generated in step 1114 may include, as payload, the cluster information, callback script or function, GUI instructions for displaying a landing page and/or the list of items, and/or a verification function.

In step 1116, content delivery systems 320 may transmit the first transmission packet to the mobile device. For instance, content delivery systems 320 may transmit the transmission packet through network 370 (FIG. 3).

Figure 12:
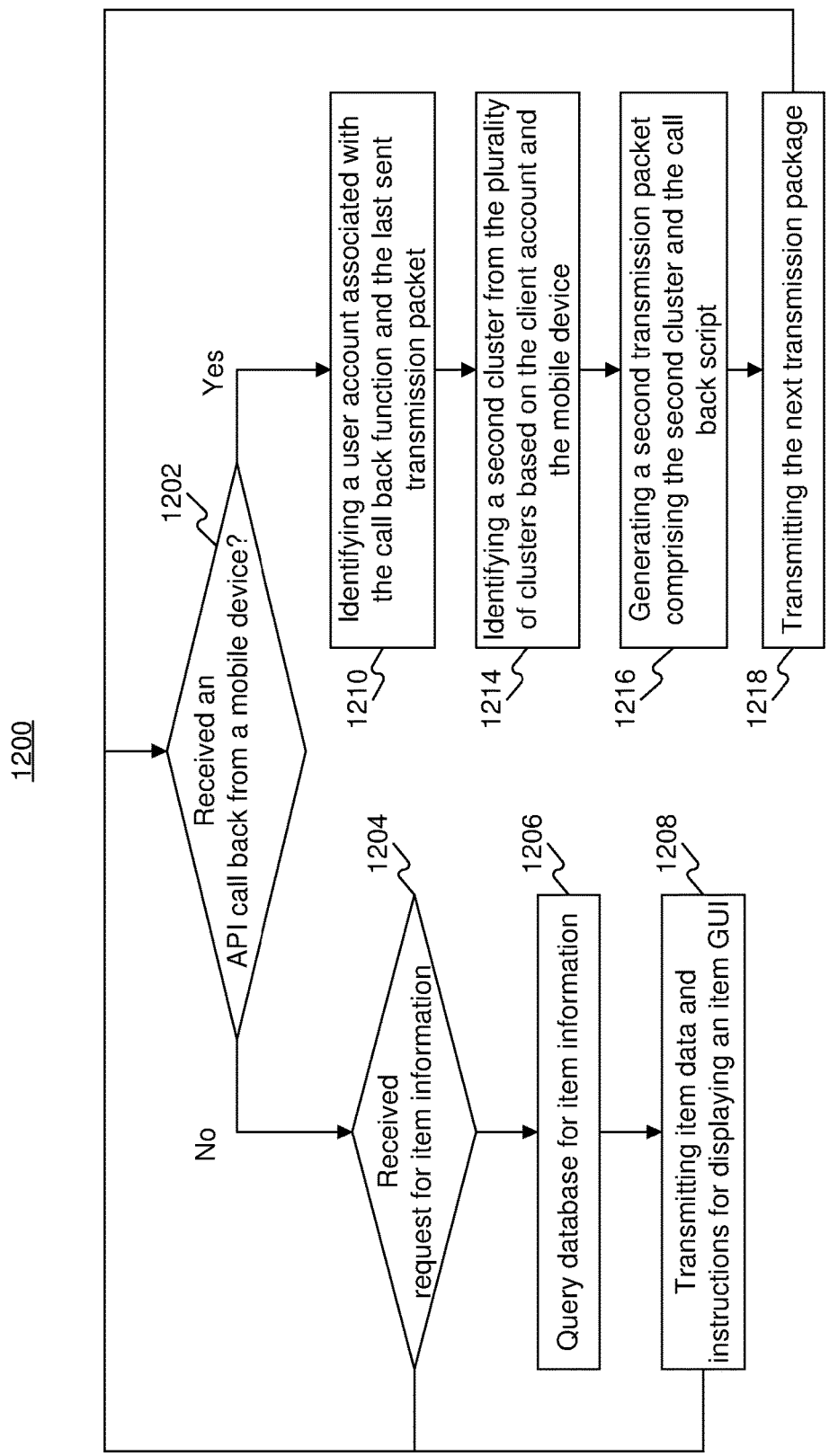
FIG. 12 is a flow chart of an exemplary process for transmitting additional website data to client devices, consistent with disclosed embodiments.

FIG. 12 is a flow chart of an exemplary process 1200 for transmitting additional website data to client devices, consistent with disclosed embodiments. In some embodiments, elements of system 300 may perform process 1200. For example, as disclosed in the steps description below, content delivery systems 320 may perform process 1200. Alternatively, or additionally, third-party systems 360 may perform process 1200, or parts of process 1200. Further, in other embodiments system 100, or parts of system 100, may perform process 1200. For instance, external front-end system 103 and/or FMG 115 may perform process 1200. In some embodiments, process 1200 may follow process 1100. In other embodiments, however, process 1200 may be independent from process 1100.

In step 1202, content delivery systems 320 may determine whether it has received an API callback from a mobile device. In some embodiments, content delivery systems 320 may determine whether it has received a callback message triggered by a callback script or function. For example, in step 1202, content delivery systems 320 may determine whether a callback message transmitted in step 1114 (FIG. 11) has been returned (e.g., because the use scrolled past a certain point). If content delivery systems 320 determines that no API callback or a callback message has been received (step 1202: No), content delivery systems 320 may continue to step 1204.

In step 1204, content delivery systems 320 may determine whether it has received a request for item information. In some embodiments, In step 1202, content delivery systems 320 may determine whether a user has selected an item displayed in the list and requesting additional information. For example, content delivery systems 320 may determine whether one of client devices 350 has selected an item in a list (e.g., an item in the cart page) and transmitted a request for additional information of the selected item as in step 1024 (FIG. 10). If content delivery systems 320 determines no request for additional information for an item has been received (step 1204: No), content delivery systems 320 may return to step 1202 to continue monitoring API calls or information requests. However, if content delivery systems 320 determines that a request for item information has been received (step 1204: Yes), content delivery systems 320 may continue to step 1206. In step 1206, content delivery systems 320 may query databases, such as databases 380, for item information. In step 1208, content delivery systems 320 may transmit item data and instructions for displaying an item GUI.

If in step 1202 content delivery systems 320 determines that an API callback or a callback message has been received (step 1202: Yes), content delivery systems 320 may continue to step 1210, in which content delivery systems 320 may identify a user account associated with the callback function or message and the last sent transmission packet. For example, as a user scrolls down a window, callback functions may send callback messages to content delivery systems 320 to get additional clusters of items for display in the user device. When receiving the callback message or API communication, content delivery systems 320 may determine a user associated with the account and a list or pointers or identifiers or clusters already transmitted.

In step 1214, content delivery systems 320 may identify a second or additional cluster from the plurality of clusters based on the client account and the mobile device. Similarly like in step 1112 (FIG. 11), content delivery systems 320 may select a second cluster for display in step 1214. The second cluster to display may be based on screen size determination, bandwidth availability, and device processing capabilities. In some embodiments, to maintain uniformity and expedite delivery of content, the second cluster identified in step 1214 may have the same number of records and/or the same file size as the first cluster in process 1100.

In step 1216, content delivery systems 320 may generate a second transmission packet including the second cluster and the callback script. In step 1216, content delivery systems 320 may generate a second transmission packet including the second cluster and the callback script, which may be the same callback script transmitted in step 1116 (FIG. 11) or a modified script based on the user response to during the initial transmission. For example, a callback script transmitted in step 1216 may be modified to have a different scrolling triggering point based on bandwidth and/or scrolling speed. As further described in connection with FIG. 7, content delivery systems 320 may dynamically adjust callback scripts or functions based on responses collected from the first transmission of the first cluster and the user response. Moreover, the transmission packet of step 1216 may also include as payload, the cluster information, callback script or functions, GUI instructions for displaying a landing page and/or the list of items, and a verification function.

In step 1218, content delivery systems 320 may transmit the second transmission packet to the mobile device. For instance, content delivery systems 320 may transmit the transmission packet through network 370 (FIG. 3).

Figure 13:
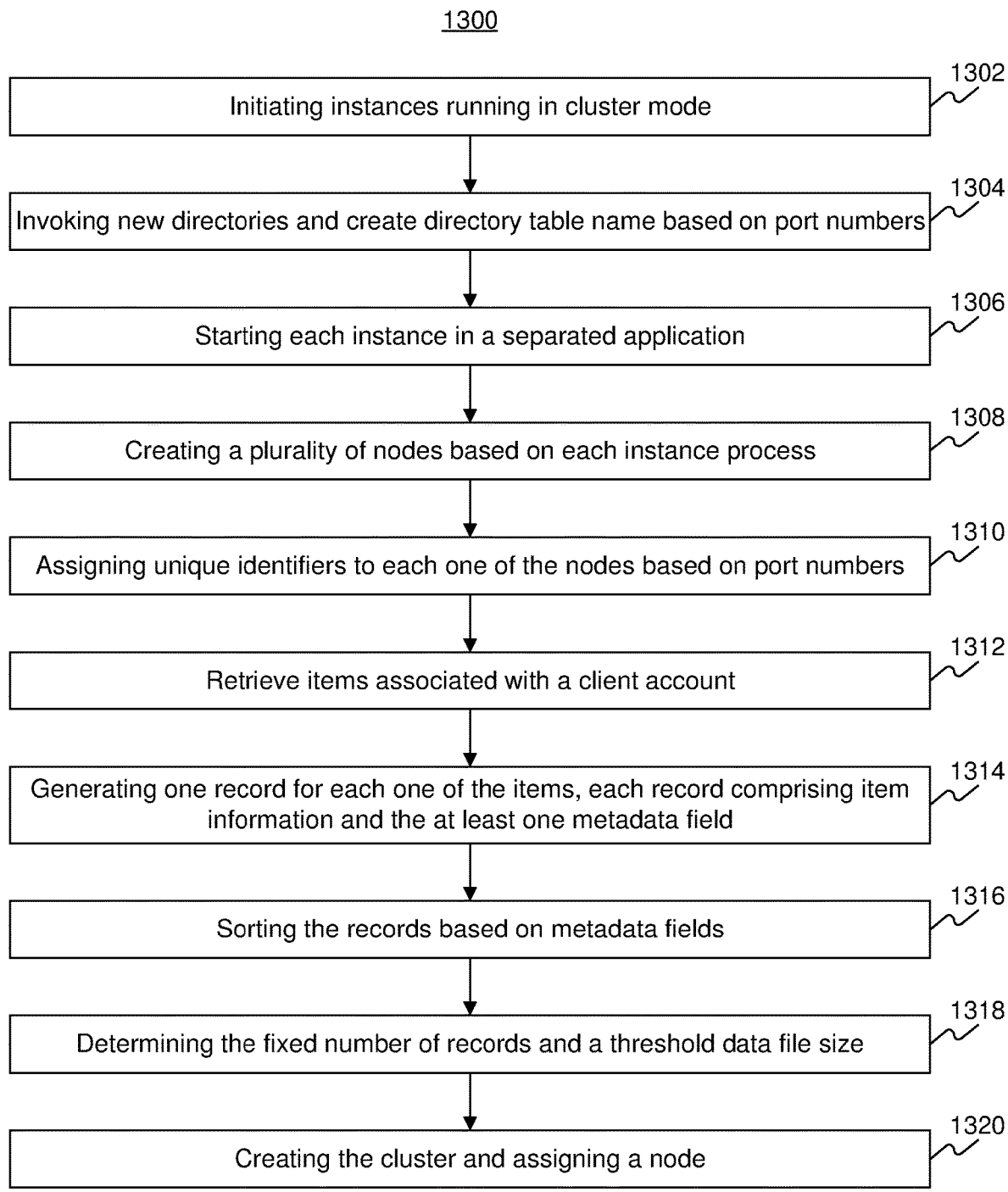
FIG. 13 is a flow chart of an exemplary process for creating clusters of records, consistent with disclosed embodiments.

FIG. 13 is a flow chart of an exemplary process 1300 for creating clusters of records, consistent with disclosed embodiments. In some embodiments, elements of system 300 may perform process 1300. For example, as disclosed in the steps description below, content delivery systems 320 may perform process 1300. Alternatively, or additionally, third-party systems 360 may perform process 1300, or parts of process 1300. Further, in other embodiments system 100, or parts of system 100, may perform process 1300. For instance, external front-end system 103 and/or FMG 115 may perform process 1300. In some embodiments, process 1300 may be performed when generating clusters of records in step 1104 (FIG. 11).

In step 1302, content delivery systems 320 may initiate instances running in cluster mode. For example, content delivery systems 320 may configure remote dictionary server instances with a cluster-enabled directive with the following instructions:

port 7000//to open port for one of the nodes cluster-enabled yes//to enable cluster operations with the node cluster-config-file nodes. conf//to configure cluster in each node cluster-node-timeout 5000//to assign a node time out for recurrence appendonly yes//to activate file persistence In step 1304, content delivery systems 320 may invoke new directories and create directory table name based on port numbers. For example, content delivery systems 320 may create directories named after port numbers using mkdir 7000 7001 7002 7003 7004 7005 (to create directories named after port numbers 7000-7005) and create a node configuration file inside each of the directories. In step 1306, content delivery systems 320 may start each instance in a separated application. For example, content delivery systems 320 may execute operations for a separated applications by starting instances through by starting a server application.

In step 1308, content delivery systems 320 may create a plurality of nodes based on each instance process. In some embodiments, content delivery systems 320 may create clusters by writing a specific configuration each one of the nodes. Nodes may be configured using remote dictionary server commands that can be used to create new clusters, check or reshard an existing cluster. In step 1310, content delivery systems 320 may assign unique identifiers to each one of the nodes based on port numbers. For example, content delivery systems 320 may assign or label clusters with unique pointers 634A-Z which may be based on the ports associated with the node related to the cluster. In step 1312, content delivery systems 320 may retrieve items associated with a client account. For example, content delivery systems 320 may request records associated with an account as in step 1002 (FIG. 10).

In step 1314, content delivery systems 320 may generate one record for each one of the items, each record including item information and the at least one metadata field. For example, content delivery systems 320 may generate a record ready of clustering based on the item information and, as described in connection with FIG. 8, detail metadata information. In step 1316, content delivery systems 320 may sort the records based on metadata fields. For example, content delivery systems 320 may sort records based on shared metadata fields or by sorting records according to their metadata values.

In step 1318, content delivery systems 320 may determine the fixed number of records and a threshold data file size. For instance, based on variables like screen size, scrolling speed, and bandwidth availability, content delivery systems 320 may determine the number of records that will be placed in each cluster and the data file size (or a threshold data file size) for each one of the clusters. In some embodiments, in step 1318 content delivery systems 320 may determine the fixed number of records is between three and eight and each cluster has substantially the same file size.

In step 1320, content delivery systems 320 may create a cluster and assign it to a node. Content delivery systems 320 may generate a plurality of remote dictionary server clusters where each cluster is associated with a pagination field specifying a unique identifier. Moreover, in some embodiments content delivery systems 320 may create clusters so that the records in each cluster are retrieved from a unique database and the at least one metadata field includes a product category metadata field and a database ID metadata field.

Figure 14:
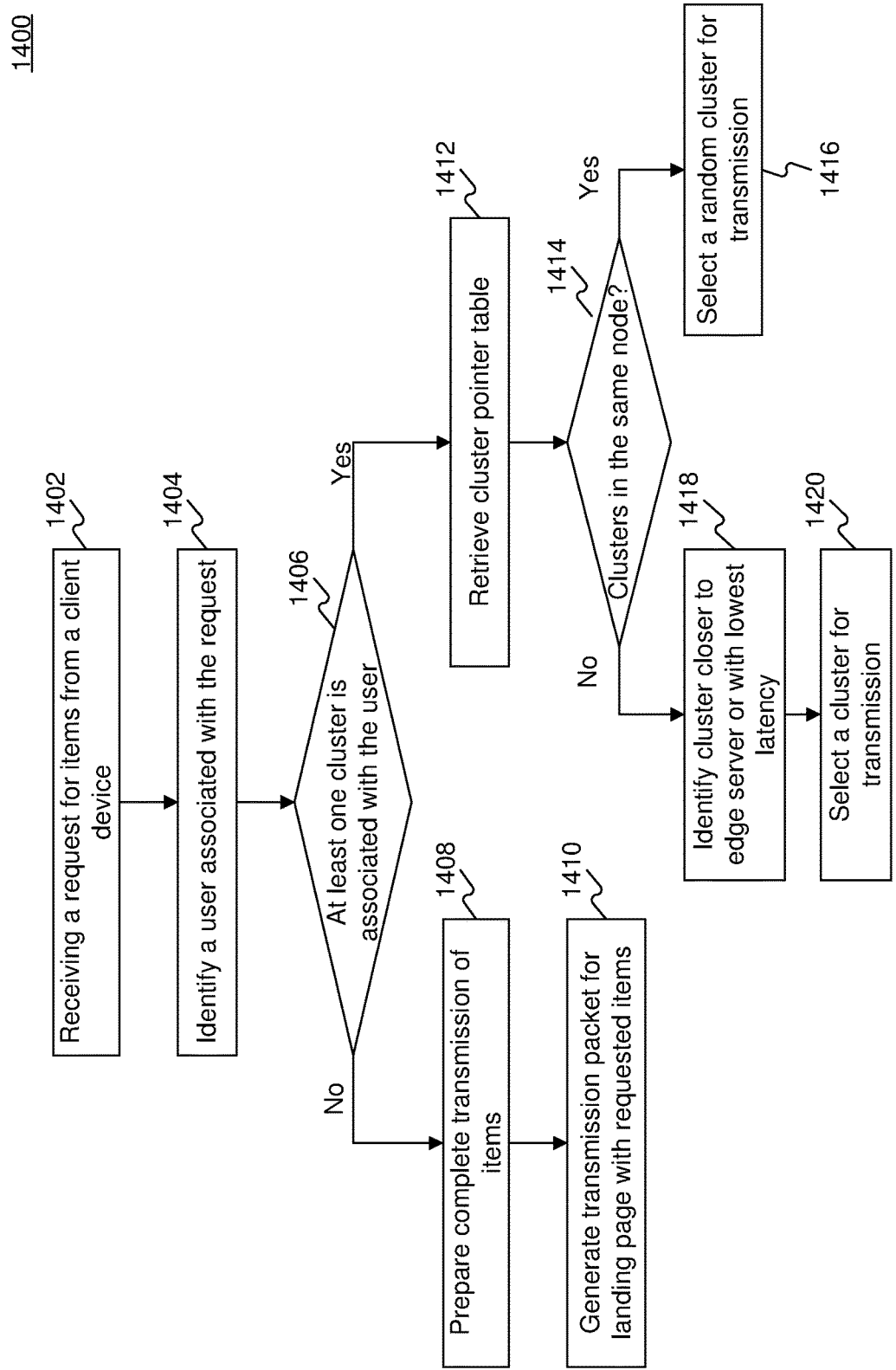
FIG. 14 is a flow chart of an exemplary process for selecting clusters or item lists in a landing page, consistent with disclosed embodiments.

FIG. 14 is a flow chart of an exemplary process for selecting clusters or item lists in a landing page, consistent with disclosed embodiments. In some embodiments, elements of system 300 may perform process 1400. For example, as disclosed in the steps description below, content delivery systems 320 may perform process 1400. Alternatively, or additionally, third-party systems 360 may perform process 1400, or parts of process 1400. Further, in other embodiments system 100, or parts of system 100, may perform process 1400. For instance, external front-end system 103 and/or FMG 115 may perform process 1400. In some embodiments, process 1400 may follow process 1300. In other embodiments, process 1400 may be independent of process 1300.

In step 1402, content delivery systems 320 may receive a request for items from a client device. For example, like in step 1106 (FIG. 11), content delivery systems 320 may receive a request to display a list from a client device through an API call. In some embodiments, the request include a client account and a mobile device location. The request may be received when a user navigates or clicks to view a Cart Page (FIG. 1D). In step 1404, content delivery systems 320 may identify a user associated with the request. For example, content delivery systems 320 may identify an account associated with the request and previous user selections.

In step 1406, content delivery systems 320 may determine whether at least one cluster is associated with the account. For example, content delivery systems 320 may query pointers of clusters to determine if at least one cluster is associated with the client account. If content delivery systems 320 determines that no clusters are associated with the user (step 1406: No), content delivery systems 320 may continue to step 1408 and retrieve the complete list of items or records required for the transmission. Further, in step 1410, content delivery systems 320 may generate a transmission packet for the requested landing page displaying the requested items. As described in connection with FIGS. 9 and 11, content delivery systems 320 may generate a transmission packet directed to client devices 350 that include, as payload, the cluster information, callback script or functions, GUI instructions for displaying a landing page and/or the list of items, or a verification function.

If in step 1406, content delivery systems 320 determines that at least one cluster is associated with the user (step 1406: Yes), content delivery systems 320 may continue to step 1412 and retrieve a cluster pointers table. The cluster pointers table may indicate nodes and clusters of items or records associated with the client account. For example, content delivery systems 320 may consult a table that includes unique pointers 634A-Z and/or associate them with client accounts or users.

In step 1412, content delivery systems 320 may determine whether clusters associated with the user are in the same node based on the cluster pointers table. If content delivery systems 320 determines the clusters are in the same node (step 1414: Yes), content delivery systems 320 may continue to step 1416 and select a random cluster for transmission of the landing page. If content delivery systems 320 determines that cluster are not in the same node (step 1414: No), content delivery systems 320 may continue to step 1418.

In step 1418, content delivery systems 320 may identify a cluster closer to edge server or with lowest latency. To minimize latency and expedite landing page loading, content delivery systems 320 may first send clusters that can deploy faster, either because they are in a closer location to requesting one of client devices 350 or because it is in a node that is less busy than others. Thus, in step 1418 content delivery systems 320 may evaluate the status of the network and the location of client devices 350 to identify a cluster that is a node that will allow faster transmission of content.

In step 1420, content delivery systems 320 may select the identified cluster for transmission of the landing page.

Figure 15:
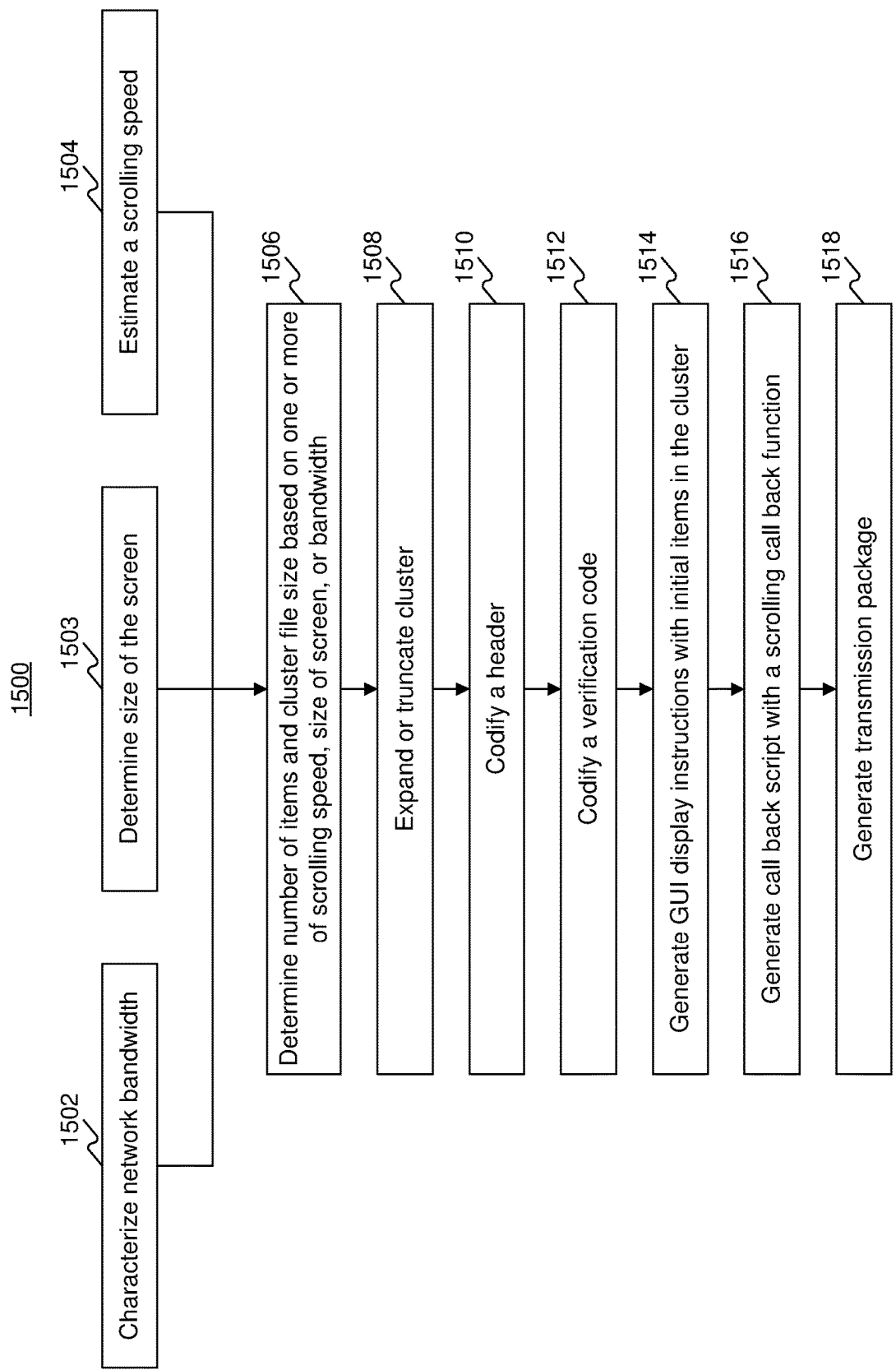
FIG. 15 is a flow chart of an exemplary process for generating transmission packets, consistent with disclosed embodiments.

FIG. 15 is a flow chart of an exemplary process for generating transmission packets, consistent with disclosed embodiments. In some embodiments, elements of system 300 may perform process 1500. For example, as disclosed in the steps description below, content delivery systems 320 may perform process 1500. Alternatively, or additionally, third-party systems 360 may perform process 1500, or parts of process 1500. Further, in other embodiments system 100, or parts of system 100, may perform process 1500. For instance, external front-end system 103 and/or FMG 115 may perform process 1500. In some embodiments, process 1500 may be part of process 1300. For example, content delivery systems 320 may perform process 1500 during step 1114 (FIG. 11).

In step 1502, content delivery systems 320 may characterize network bandwidth. For example, content delivery systems 320 use ping functions to determine latency. Alternatively, or additionally, in step 1502 content delivery systems 320 may measure the maximum rate that information can be transferred, network throughput, the delay between the sender and the receiver decoding it, and processing time at any nodes the information traverses. Further, content delivery systems 320 may evaluate Jitter and Error rates. In step 1503, content delivery systems 320 may determine size of the mobile device screen. For example, based on requests received from client devices 350, content delivery systems 320 may determine a mobile devices screen. In step 1504, content delivery systems 320 may estimate a scrolling speed. For example, in some embodiments callback functions or scripts may include functions that monitor speed of scrolling. In step 1504 content delivery systems may estimate and categorize the scrolling speed of a user. As shown in FIG. 15, in some embodiments steps 1502-1504 may be perform in parallel and/or simultaneously.

In step 1506, content delivery systems 320 may determine a number of items and cluster file size based on one or more of scrolling speed, size of screen, or bandwidth. For example, when preparing clusters for large screens, content delivery systems 320 may prepare clusters with a larger number of items and a larger cluster size. In contrast, if the bandwidth is determined to be slow or error prone, content delivery systems may determine a lower number of items per cluster. But if the scrolling speed is high, content delivery systems 320 may select a higher number of items to cluster to avoid too many or too frequent calls for additional data.

In step 1508, content delivery systems 320 may expand or truncate clusters based on the determinations of step 1506. For example, if cluster have been already created, based on for example process 1300 (FIG. 13), content delivery systems 320 may adjust the cluster size based on the determination of step 1506. Step 1508 may include re arranging records in different nodes and clusters and/or creating additional clusters with operations or steps discussed in connection with FIG. 13.

In step 1510, content delivery systems 320 may codify a header for transmission. For example, content delivery systems 320 may codify blocks 902-924 (FIG. 9) of a transmission packet. In step 1510, codifying a header may include assembling a TCP header by collecting data regarding the version, IHL, type of service. Codifying a header may also include determining a total length of the packet and/or retrieving addresses and ports to route the transmission packet. Further, codifying a header in step 1510 may also include assigning values to variables in a TCP packet, such as a time to live.

In step 1512, content delivery systems 320 may codify a verification code for transmission (e.g., verification instructions 932). For example, in step 1512 codifying a verification code may include generating instructions for GUI observation and evaluation. In such embodiments, codifying a verification code may include generating operations for checking screens, checking GUI objects (exist, enabled, etc.), and checking GUI objects' data (text displayed, item selected, etc.). The evaluation may include instructions for assessment of Pass/Fail criteria for GUI observations.

In step 1514, content delivery systems 320 may generate GUI instructions (such as GUI instructions 930) with initial items in the cluster. For example, in step 1514 content delivery systems 320 may generate instructions for display of a landing page, such as landing page 701 (FIG. 7), or display of the list based on information in cluster 926. The instructions of step 1514 may include operations to identify an operating system (OS) and based on the operating systems using libraries of OS in client devices 350 that interface with the monitor/display of client devices 350. In such embodiments, in step 1514 content delivery systems 320 may generate and/or compile instructions to call for GUI libraries and interact with those libraries of the operating system to interact with the monitor.

In step 1516, content delivery systems 320 may generate a callback script with a scrolling callback function. For instance, content delivery systems 320 may generate a script with a function that gets triggered when a user scrolls past a certain point and/or a certain item, as discussed in connection with FIG. 7.

In step 1518, content delivery systems 320 may generate a transmission packet using the header, verification code, GUI instructions, and the callback function or script. For example, in step 1518 content delivery systems 320 may generate transmission packet following the structure of packet 900.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A computerized system for transmitting website data to client devices, the system comprising:
    a memory storing instructions; and
    at least one processor configured to execute the instructions to perform operations comprising:
        generating a plurality of clusters comprising a fixed number of records, records in each cluster sharing at least one metadata field;
        receiving a request to display a list from a client device, the request comprising a client account and a location of the client device;
        identifying a first cluster, from the plurality of clusters, for display at a landing page based on the client account and the location;
        generating a first transmission packet, the first transmission packet comprising the first cluster and a callback script, the callback script comprising a navigation triggered function and a callback message;
        transmitting the first transmission packet to the client device;
        receiving the callback message from the client device;
        identifying a second cluster from the plurality of clusters based on the client account, the client device, and the first cluster;
        generating a second transmission packet comprising the second cluster and the callback script; and
        transmitting the second transmission packet to the client device,
    wherein generating the plurality of clusters comprises:
        creating a plurality of nodes based on instances running in cluster modes on one or more databases;
        assigning identifiers to each one of the plurality of nodes based on port numbers;
        retrieving items associated with the client account;
        generating one record for each shopping item associated with the client account, each record comprising item information and the at least one metadata field;
        sorting the records based on metadata fields; and
        determining the fixed number of records based on a threshold data file size.

2. The system of claim 1, wherein:
    the records in each cluster are retrieved from a unique database; and
    the at least one metadata field comprises a product category metadata field and a database ID metadata field.

3. The system of claim 1, wherein:
    the fixed number of records is between three and eight; and
    each cluster has substantially the same file size.

4. The system of claim 3 wherein the fixed number of records is six records.

5. The system of claim 1, wherein:
    the request to display the list comprises a request to display items in a virtual cart; and
    the items comprise items a user selected from a plurality of single display pages.

6. The system of claim 1, wherein
    the navigation triggered function comprises a scrolling triggered function; and
    the scrolling triggered function configures the client device to transmit the callback message when the client device displays a second to last record in a cluster.

7. The system of claim 1, wherein each cluster comprises a pagination field comprising a unique identifier.

8. The system of claim 7, wherein generating the plurality of clusters comprises generating a remote dictionary server cluster.

9. The system of claim 1, wherein:
    the client devices comprises a mobile device;
    the request to display the list comprises a screen size of the mobile device; and
    the operations further comprise adjusting the callback script based on the screen size of the mobile device.

10. A computer-implemented method for transmitting website data to client device, the method comprising:
    generating a plurality of clusters comprising a fixed number of records, records in each cluster sharing at least one metadata field;
    receiving a request to display a list from a client device, the request comprising a client account and a location of the client device;
    identifying a first cluster, from the plurality of clusters, for display at a landing page based on the client account and the location;
    generating a first transmission packet, the first transmission packet comprising the first cluster and a callback script, the callback script comprising a navigation triggered function and a callback message;
    transmitting the first transmission packet to the client device;
    receiving the callback message from the client device;
    identifying a second cluster, from the plurality of clusters, based on the client account, the client device, and the first cluster;
    generating a second transmission packet comprising the second cluster and the callback script; and
    transmitting the second transmission packet to the client device,
    wherein generating the plurality of clusters comprises:
        creating a plurality of nodes based on instances running in cluster modes on one or more databases;
        assigning identifiers to each one of the plurality of nodes based on port numbers;
        retrieving items associated with the client account;
        generating one record for each shopping items associated with the client account, each record comprising item information and the at least one metadata field;

sorting the records based on metadata fields; and determining the fixed number of records based on a threshold data file size.

11. The method of claim 10, wherein:

the records in each cluster are retrieved from a unique database; and the at least one metadata field comprises a product category metadata field and a database ID metadata field.

12. The method of claim 10, wherein:

the fixed number of records is between three and eight; and each cluster has substantially the same file size.

13. The method of claim 12, wherein the fixed number of records is six records.

14. The method of claim 10, wherein:

the request to display the list comprises a request to display items in a virtual cart; and the items comprise items a user selected from a plurality of single display pages.

15. The method of claim 10, wherein:

the navigation triggered function comprises a scrolling triggered function; and the scrolling triggered function configures the client device to transmit the callback message when the client device displays a second to last record in a cluster.

16. The method of claim 10, wherein:

each cluster comprises a pagination field comprising a unique identifier; and generating the plurality of clusters comprises generating a remote dictionary server cluster.

17. The method of claim 10, wherein:

the client device comprises a mobile device;

the request to display the list, comprises a screen size of the mobile device; and the method further comprises adjusting the callback script based on the screen size of the mobile device.

18. A system for transmitting website data to a client device, the system comprising:

at least one processor; and at least one memory device comprising instructions that when executed cause the at least one processor to:

generate a plurality of clusters each comprising a fixed number of records, the records in each cluster sharing at least a product category metadata field and a database ID metadata field;

receive a request to display a list of items in a virtual cart from a mobile device, the request comprising a client account and a location of the mobile device;

identify a first cluster, from the plurality of clusters, for display at a landing page based on the client account and the location;

generate a first transmission packet, the first transmission packet comprising the first cluster and a callback script, the callback script comprising a scrolling triggered function and a callback message, the scrolling triggered function configuring the mobile device to transmit the callback message when the mobile device displays a second to last record in a cluster;

transmit the first transmission packet to the mobile device;

receive the callback message from the mobile device;

identify a second cluster from the plurality of clusters based on the client account, the mobile device, and the first cluster;

generate a second transmission packet comprising the second cluster and the callback script; and transmit the second transmission packet to the mobile device, wherein to generate the plurality of clusters, the at least one processor is configured to:

create a plurality of nodes based on instances running in cluster modes on one or more databases;

assign identifiers to each one of the plurality of nodes based on port numbers;

retrieve items associated with the client account;

generate one record for each shopping items associated with the client account, each record comprising item information and the at least one metadata field;

sort the records based on metadata fields; and determine the fixed number of records based on a threshold data file size.

\* \* \* \* \*